(12) United States Patent
Sasaki et al.

(10) Patent No.: US 8,780,497 B2
(45) Date of Patent: Jul. 15, 2014

(54) MAGNETIC HEAD FOR PERPENDICULAR MAGNETIC RECORDING HAVING A RETURN PATH SECTION

(75) Inventors: Yoshitaka Sasaki, Santa Clara, CA (US); Hiroyuki Ito, Milpitas, CA (US); Kazuki Sato, Milpitas, CA (US); Seiichiro Tomita, Milpitas, CA (US); Hironori Araki, Milpitas, CA (US); Tatsuya Shimizu, Hong Kong (CN)

(73) Assignees: Headway Technologies Inc., Milpitas, CA (US); SAE Magnetics (H.K) Ltd., Hong Kong (CN)

( * ) Notice: Subject to any disclaimer, the term of this patent is extended or adjusted under 35 U.S.C. 154(b) by 16 days.

(21) Appl. No.: 13/493,652

(22) Filed: Jun. 11, 2012

(65) Prior Publication Data
US 2013/0329319 A1 Dec. 12, 2013

(51) Int. Cl.
*G11B 5/17* (2006.01)

(52) U.S. Cl.
USPC .................................. 360/123.06; 360/123.1

(58) Field of Classification Search
USPC .................. 360/123.15, 123.17, 123.02–123
See application file for complete search history.

(56) References Cited

U.S. PATENT DOCUMENTS

| | | | |
|---|---|---|---|
| 6,954,340 B2 | 10/2005 | Shukh et al. | |
| 2002/0141111 A1* | 10/2002 | Batra et al. | 360/125 |
| 2005/0128637 A1* | 6/2005 | Johnston et al. | 360/125 |
| 2007/0214635 A1* | 9/2007 | Sasaki et al. | 29/603.15 |
| 2008/0088971 A1* | 4/2008 | Sasaki et al. | 360/110 |
| 2008/0165452 A1* | 7/2008 | Bozeman et al. | 360/319 |
| 2008/0170334 A1* | 7/2008 | Otagiri | 360/313 |
| 2008/0273268 A1* | 11/2008 | Hsiao et al. | 360/234.6 |
| 2009/0296275 A1* | 12/2009 | Sasaki et al. | 360/125.3 |
| 2010/0321835 A1* | 12/2010 | Zhang et al. | 360/319 |
| 2011/0041322 A1* | 2/2011 | Sasaki et al. | 29/603.18 |
| 2012/0140358 A1* | 6/2012 | Sasaki et al. | 360/122 |
| 2012/0147503 A1* | 6/2012 | Zou et al. | 360/125.41 |

* cited by examiner

*Primary Examiner* — Wayne Young
*Assistant Examiner* — Adam B Dravininkas
(74) *Attorney, Agent, or Firm* — Oliff PLC

(57) ABSTRACT

A magnetic head includes first and second coils, a main pole, a write shield, a return path section, and a core part. The return path section includes a yoke part magnetically connected to the write shield, and a coupling part located away from a medium facing surface and magnetically coupling the yoke part and the main pole to each other. The first coil is located on the front side in the direction of travel of a recording medium relative to the main pole and wound around the coupling part. The core part is located farther from the medium facing surface than is the coupling part, and is magnetically connected to the main pole. The second coil is located on the front side in the direction of travel of the recording medium relative to the main pole and wound around the core part.

10 Claims, 18 Drawing Sheets

MAGNETIC HEAD FOR PERPENDICULAR MAGNETIC RECORDING HAVING A RETURN PATH SECTION

BACKGROUND OF THE INVENTION

1. Field of the Invention

The present invention relates to a magnetic head for perpendicular magnetic recording that is used for writing data on a recording medium by means of a perpendicular magnetic recording system, and more specifically, to a magnetic head for perpendicular magnetic recording that has a main pole, a shield, and a return path section.

2. Description of Related Art

The recording systems of magnetic read/write apparatuses include a longitudinal magnetic recording system wherein signals are magnetized in a direction along the plane of a recording medium (the longitudinal direction) and a perpendicular magnetic recording system wherein signals are magnetized in a direction perpendicular to the plane of a recording medium. It is known that the perpendicular magnetic recording system is harder to be affected by thermal fluctuation of the recording medium and capable of providing higher linear recording density, compared with the longitudinal magnetic recording system.

Magnetic heads for perpendicular magnetic recording typically have, like those for longitudinal magnetic recording, a structure where a read head section having a magnetoresistive element (hereinafter, also referred to as MR element) for reading and a write head section having an induction-type electromagnetic transducer for writing are stacked on the top surface of a substrate. The write head section includes a main pole that produces a write magnetic field in a direction perpendicular to the plane of the recording medium. The main pole includes, for example, a track width defining portion having an end located in a medium facing surface that faces a recording medium, and a wide portion that is connected to the other end of the track width defining portion and is greater in width than the track width defining portion. The track width defining portion has a generally constant width. To achieve higher recording density, it is required that the write head section of the perpendicular magnetic recording system be smaller in track width and improved in write characteristics such as overwrite property which is a parameter indicating an overwriting capability.

A magnetic head for use in a magnetic disk drive such as a hard disk drive is typically provided in a slider. The slider has the medium facing surface mentioned above. The medium facing surface has an air inflow end (a leading end) and an air outflow end (a trailing end). The slider is designed to slightly fly over the surface of the recording medium by means of an airflow that comes from the air inflow end into the space between the medium facing surface and the recording medium.

Here, the side of positions closer to the leading end relative to a reference position will be defined as the leading side, and the side of positions closer to the trailing end relative to the reference position will be defined as the trailing side. The leading side is the rear side in the direction of travel of the recording medium relative to the slider. The trailing side is the front side in the direction of travel of the recording medium relative to the slider.

The magnetic head is typically disposed near the trailing end of the medium facing surface of the slider. In a magnetic disk drive, positioning of the magnetic head is performed by a rotary actuator, for example. In this case, the magnetic head moves over the recording medium along a circular orbit about the center of rotation of the rotary actuator. In such a magnetic disk drive, a tilt of the magnetic head with respect to the tangent of the circular track, which is called a skew, occurs according to the position of the magnetic head across the tracks.

In particular, in a magnetic disk drive of the perpendicular magnetic recording system which is higher in capability of writing on a recording medium than the longitudinal magnetic recording system, the skew mentioned above can cause the phenomenon that signals already written on one or more tracks that are adjacent to a track targeted for writing are erased or attenuated during writing of a signal on the track targeted for writing (such a phenomenon will hereinafter be referred to as adjacent track erasure). For higher recording densities, it is necessary to prevent adjacent track erasure.

Providing a write shield near the main pole is effective for preventing adjacent track erasure induced by the skew mentioned above and increasing the recording density. For example, U.S. Pat. No. 6,954,340 B2 and U.S. Patent Application Publication No. 2005/0128637 A1 describe a magnetic head including a write shield having an end face that is located in the medium facing surface to wrap around an end face of the main pole.

A magnetic head including a write shield is typically provided with one or more return path sections for connecting the write shield to a part of the main pole away from the medium facing surface. The one or more return path sections form one or more spaces between the main pole and the one or more return path sections. A coil or coils are provided to pass through the one or more spaces. The write shield and the one or more return path sections have the function of capturing a magnetic flux that is produced from the end face of the main pole and spreads in directions other than the direction perpendicular to the plane of the recording medium, so as to prevent the magnetic flux from reaching the recording medium. The write shield and the one or more return path sections also have the function of allowing a magnetic flux that has been produced from the end face of the main pole and has magnetized the recording medium to flow back to the main pole. Thus, the magnetic head including the write shield makes it possible to prevent adjacent track erasure and allows a further improvement of the recording density.

U.S. Pat. No. 6,954,340 B2 and U.S. Patent Application Publication No. 2005/0128637 A1 each disclose a magnetic head including, as the aforementioned one or more return path sections, a return path section located on the trailing side relative to the main pole and a return path section located on the leading side relative to the main pole.

The position of an end of a record bit to be recorded on a recording medium depends on the position of the trailing-side end of the end face of the main pole located in the medium facing surface. To define the position of the end of the record bit with high accuracy, it is therefore effective to provide the write shield with an end face including an end face portion located on the trailing side relative to the end face of the main pole.

In addition, as the frequency of a recording signal is increased in order to increase the recording density, the magnetic head is required to be improved in the rate of change in the direction of the magnetic flux produced from the end face of the main pole. To satisfy this requirement in the magnetic head having a write shield, it is particularly effective to provide a return path section located on the trailing side relative to the main pole and to reduce the length of the return path section, in addition to forming the end face of the write shield to include an end face portion located on the trailing side relative to the end face of the main pole. To this end, it is effective to reduce the number of turns of the coil passing through the space formed between the main pole and the return path section. However, this would cause a shortage of magnetomotive force produced by the coil, thereby hindering the main pole from producing a write magnetic field of sufficient magnitude.

As such, it has conventionally been difficult to allow the main pole to produce a write magnetic field of sufficient magnitude while reducing the length of a return path section that is located on the trailing side relative to the main pole.

OBJECT AND SUMMARY OF THE INVENTION

It is an object of the present invention to provide a magnetic head for perpendicular magnetic recording that allows the main pole to produce a write magnetic field of sufficient magnitude while allowing a reduction in length of a return path section that is located on the front side in the direction of travel of a recording medium relative to the main pole.

A magnetic head for perpendicular magnetic recording of the present invention includes: a medium facing surface that faces a recording medium; first and second coils; a main pole; a write shield made of a magnetic material; a gap part made of a nonmagnetic material; a first return path section made of a magnetic material; and a core part made of a magnetic material. The first and second coils produce magnetic fields corresponding to data to be written on the recording medium. The main pole has an end face located in the medium facing surface. The main pole allows magnetic fluxes corresponding to the magnetic fields produced by the first and second coils to pass, and produces a write magnetic field for writing the data on the recording medium by means of a perpendicular magnetic recording system. The write shield has an end face located in the medium facing surface. The gap part is interposed between the main pole and the write shield. The first return path section and the core part are located on the front side in the direction of travel of the recording medium relative to the main pole.

The end face of the write shield includes a first end face portion located on the front side in the direction of travel of the recording medium relative to the end face of the main pole. The first return path section includes a yoke part that is magnetically connected to the write shield, and a coupling part that is located away from the medium facing surface and magnetically couples the yoke part and the main pole to each other. The main pole, the gap part, the write shield, the yoke part, and the coupling part form a first space enclosed by these components. The first coil is located on the front side in the direction of travel of the recording medium relative to the main pole and wound around the coupling part. Part of the first coil passes through the first space. The core part is located farther from the medium facing surface than is the coupling part, and is magnetically connected to the main pole. The second coil is located on the front side in the direction of travel of the recording medium relative to the main pole and wound around the core part.

In the magnetic head for perpendicular magnetic recording of the present invention, the first coil may include a first winding portion having a planar spiral shape, while the second coil may include a second winding portion having a planar spiral shape. In this case, the first winding portion and the second winding portion may be located in one plane.

In the magnetic head for perpendicular magnetic recording of the present invention, the second coil may have a number of turns no smaller than that of the first coil, or may have a number of turns greater than that of the first coil.

In the magnetic head for perpendicular magnetic recording of the present invention, the main pole may include a first portion, and a second portion that is located farther from the medium facing surface than is the first portion and connected to the first portion. In this case, the coupling part may be directly connected to the first portion of the main pole, while the core part may be directly connected to the second portion of the main pole.

In the magnetic head for perpendicular magnetic recording of the present invention, the yoke part may include a first portion, and a second portion that is located farther from the medium facing surface than is the first portion and connected to the first portion. In this case, the coupling part may be directly connected to the first portion of the yoke part, while the core part may be directly connected to the second portion of the yoke part and magnetically connected to the main pole via the yoke part and the coupling part.

The magnetic head for perpendicular magnetic recording of the present invention may further include: a second return path section made of a magnetic material and located on the rear side in the direction of travel of the recording medium relative to the main pole; and a third coil located on the rear side in the direction of travel of the recording medium relative to the main pole. The second return path section connects the write shield and part of the main pole away from the medium facing surface to each other so as to form a second space enclosed by the main pole, the gap part, the write shield, and the second return path section. The third coil is wound around part of the second return path section, and part of the third coil passes through the second space. In this case, the second coil may have a number of turns no smaller than that of the first coil, and the third coil may have a number of turns no smaller than that of the second coil. Alternatively, the second coil may have a number of turns greater than that of the first coil, and the third coil may have a number of turns greater than that of the second coil.

In the magnetic head for perpendicular magnetic recording of the present invention, the end face of the write shield may further include a second, a third, and a fourth end face portion. The second end face portion is located on the rear side in the direction of travel of the recording medium relative to the end face of the main pole. The third and fourth end face portions are located on opposite sides of the end face of the main pole in the track width direction.

The magnetic head for perpendicular magnetic recording of the present invention is provided with the core part and the second coil, as well as the first return path section and the first coil, on the front side in the direction of travel of the recording medium relative to the main pole. Consequently, the magnetomotive forces of the first coil and the second coil allow the main pole to produce a write magnetic field of sufficient magnitude even if the number of turns of the first coil is reduced to reduce the length of the first return path section. Consequently, according to the present invention, it is possible to produce a write magnetic field of sufficient magnitude from the main pole while reducing the length of the first return path section located on the front side in the direction of travel of the recording medium relative to the main pole.

Other objects, features and advantages of the present invention will become fully apparent from the following description.

DETAILED DESCRIPTION OF THE PREFERRED EMBODIMENTS

First Embodiment

Figure 1:
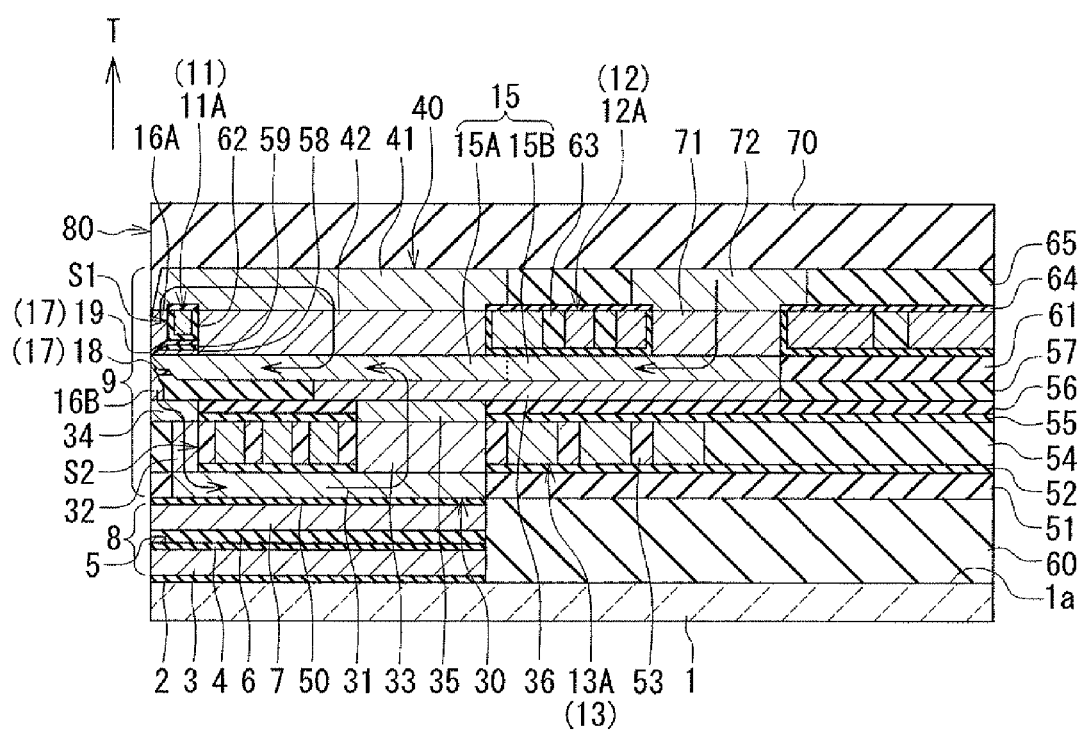
FIG. 1 is a cross-sectional view of a magnetic head according to a first embodiment of the invention.
Figure 2:
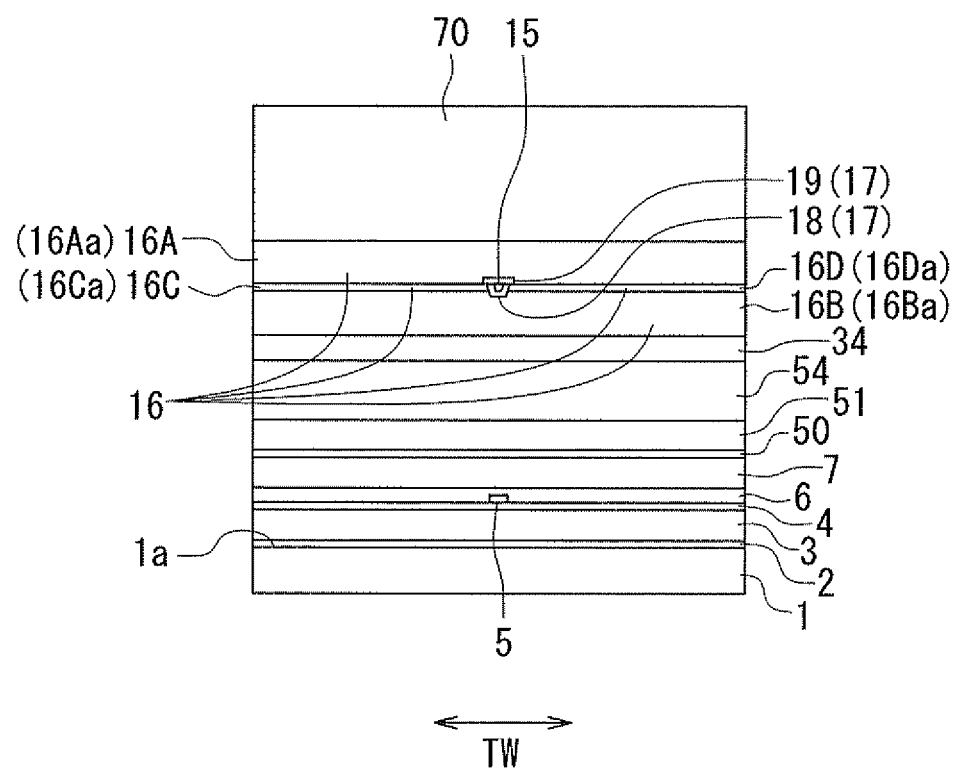
FIG. 2 is a front view showing the medium facing surface of the magnetic head according to the first embodiment of the invention.
Figure 3:
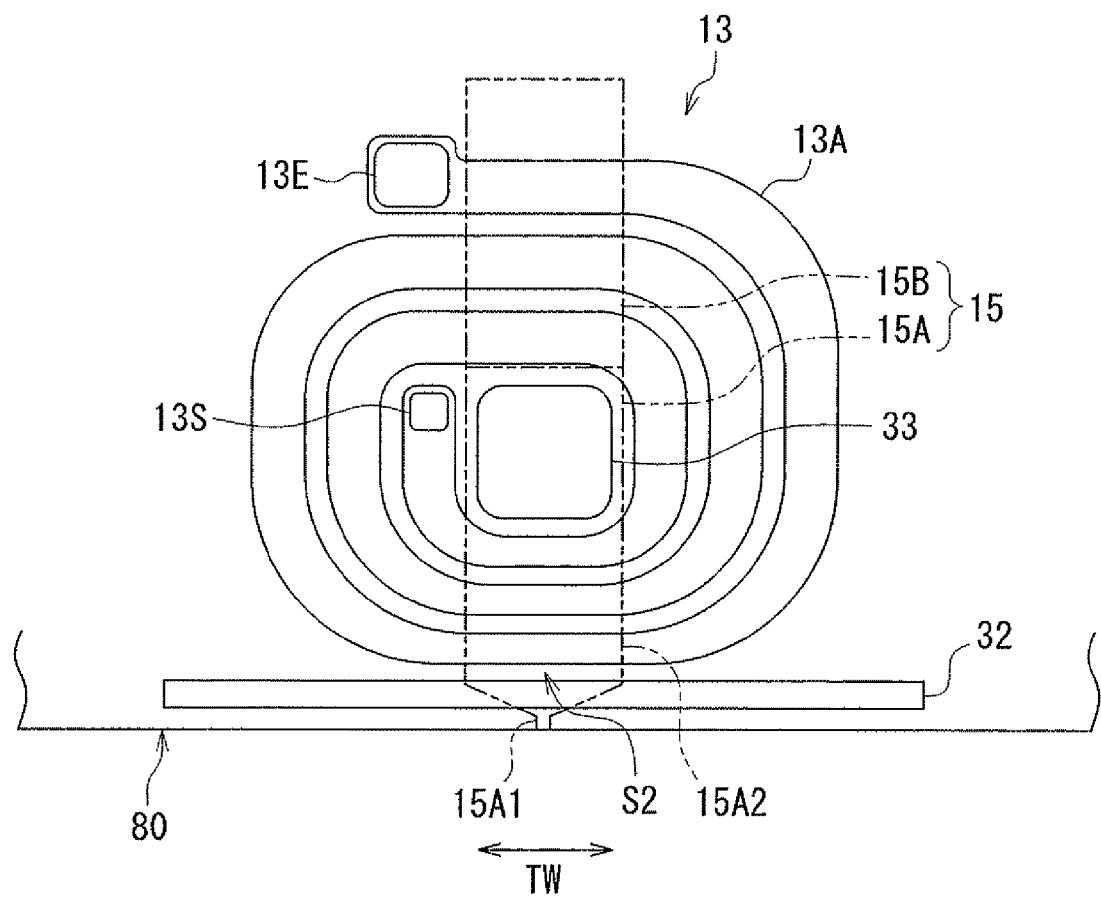
FIG. 3 is a plan view showing a third coil of the magnetic head according to the first embodiment of the invention.
Figure 4:
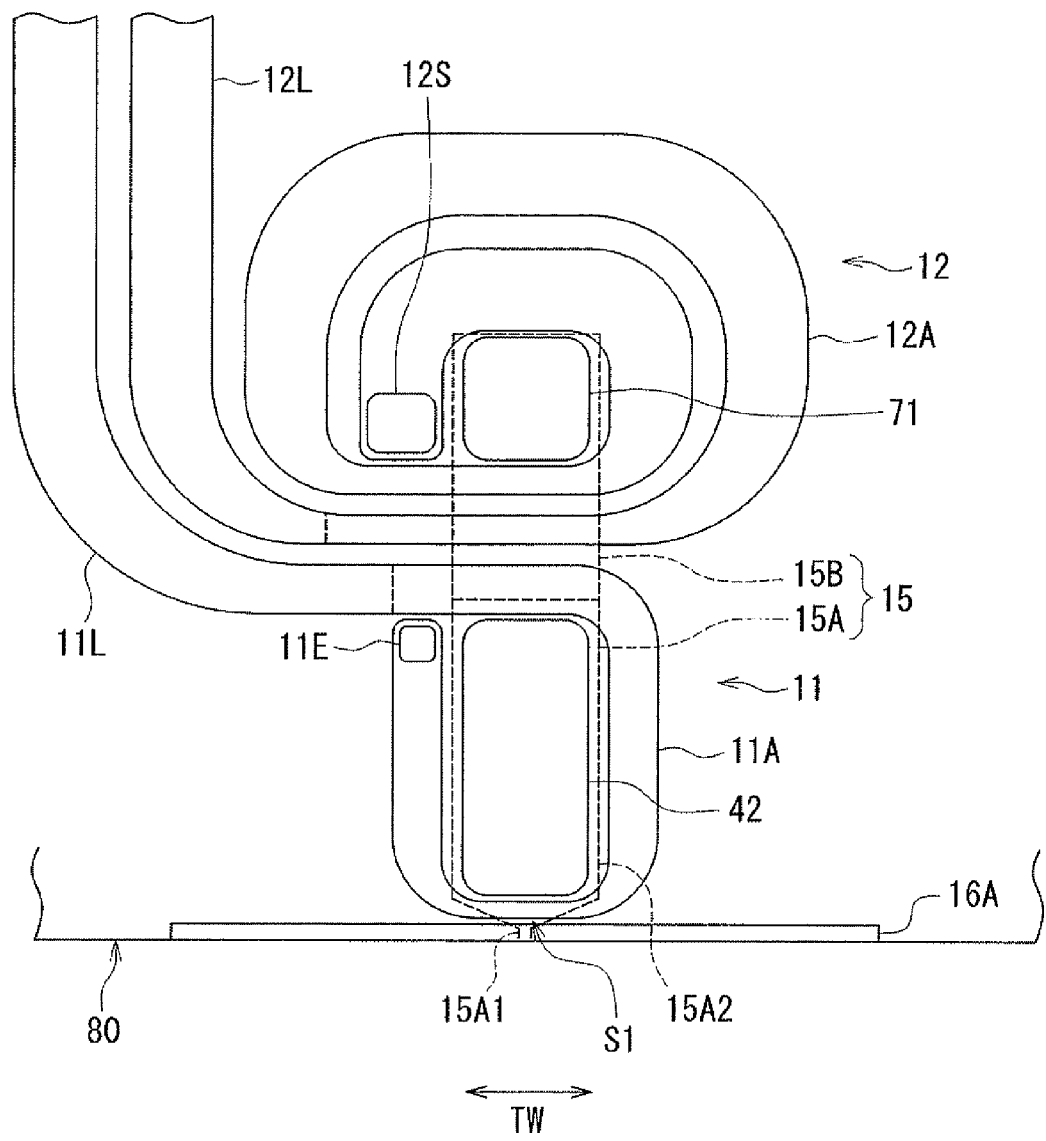
FIG. 4 is a plan view showing first and second coils of the magnetic head according to the first embodiment of the invention.
Figure 5:
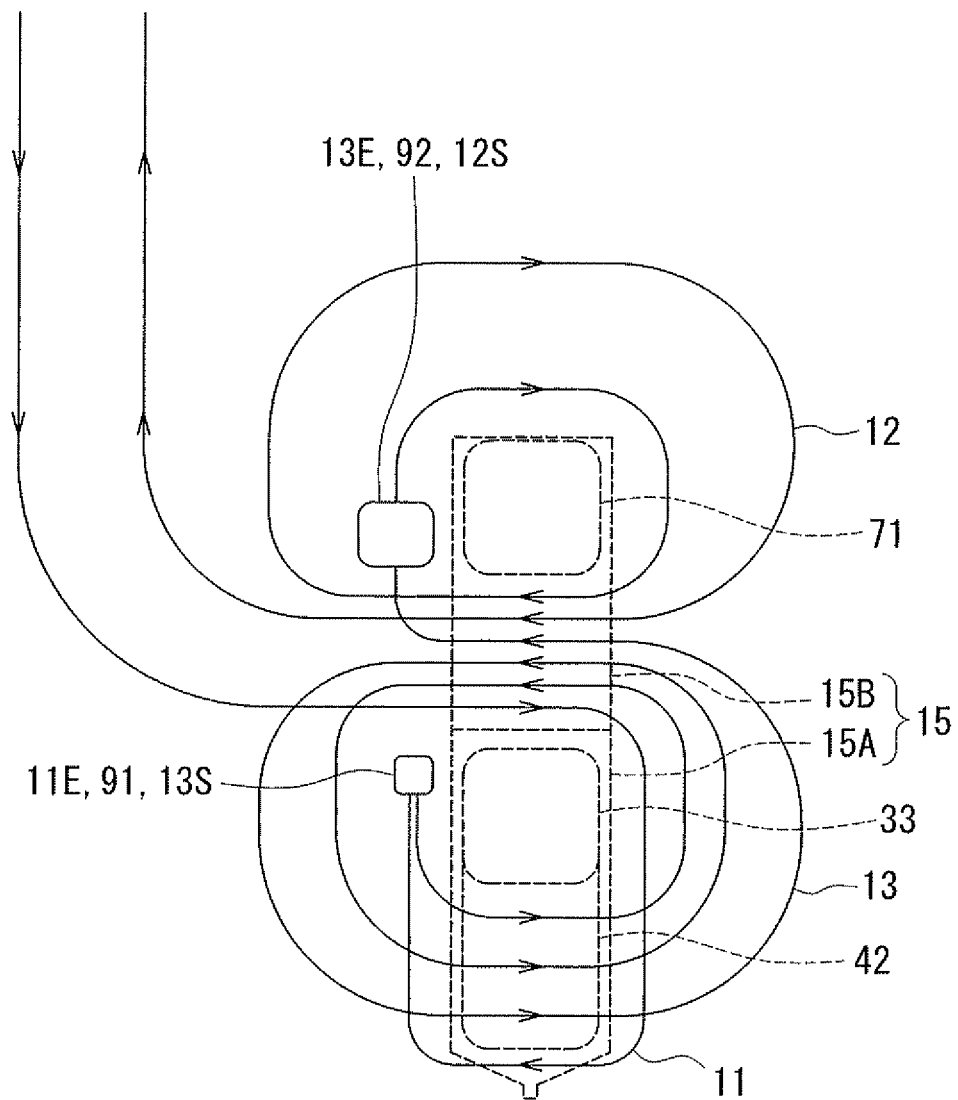
FIG. 5 is an explanatory diagram illustrating how the first to third coils are arranged and connected in the magnetic head according to the first embodiment of the invention.

Embodiments of the present invention will now be described in detail with reference to the drawings. First, reference is made to FIG. 1 to FIG. 5 to describe the configuration of a magnetic head according to a first embodiment of the invention. FIG. 1 is a cross-sectional view of the magnetic head according to the present embodiment. Note that FIG. 1 shows a cross section perpendicular to the medium facing surface and to the top surface of the substrate. In FIG. 1, the arrow with the symbol T indicates the direction of travel of a recording medium. The arrows drawn within the magnetic head in FIG. 1 indicate the flows of magnetic fluxes. FIG. 2 is a front view showing the medium facing surface of the magnetic head according to the present embodiment. FIG. 3 is a plan view showing a third coil of the magnetic head according to the present embodiment. FIG. 4 is a plan view showing first and second coils of the magnetic head according to the present embodiment. The arrows with the symbol TW in FIG. 2 to FIG. 4 indicate track width direction. FIG. 5 is an explanatory diagram illustrating how the first to third coils are arranged and connected in the magnetic head according to the present embodiment.

As shown in FIG. 1 and FIG. 2, the magnetic head for perpendicular magnetic recording (hereinafter simply referred to as the magnetic head) according to the present embodiment includes: a substrate 1 made of a ceramic material such as aluminum oxide-titanium carbide ($Al_2O_3$—TiC) and having a top surface 1a; an insulating layer 2 made of an insulating material such as alumina ($Al_2O_3$) and disposed on the top surface 1a of the substrate 1; a first read shield layer 3 made of a magnetic material and disposed on the insulating layer 2; a first read shield gap film 4 which is an insulating film disposed to cover the first read shield layer 3; a magnetoresistive (MR) element 5 serving as a read element disposed on the first read shield gap film 4; a second read shield gap film 6 which is an insulating film disposed on the MR element 5; and a second read shield layer 7 made of a magnetic material and disposed on the second read shield gap film 6.

An end of the MR element 5 is located in a medium facing surface 80 that faces the recording medium. The MR element 5 may be an element formed of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current for use in magnetic signal detection is fed in a direction generally parallel to the plane of layers constituting the GMR element or the current-perpendicular-to-plane (CPP) type in which the current for use in magnetic signal detection is fed in a direction generally perpendicular to the plane of the layers constituting the GMR element.

The parts from the first read shield layer 3 to the second read shield layer 7 constitute a read head section 8. The magnetic head further includes nonmagnetic layers 50 and 60 each made of a nonmagnetic material. The nonmagnetic layer 50 is disposed on the second read shield layer 7. The nonmagnetic layer 60 is disposed on the top surface 1a of the substrate 1 and surrounds the read head section 8 and the nonmagnetic layer 50. The top surfaces of the nonmagnetic layers 50 and 60 are even with each other. The nonmagnetic layers 50 and 60 are made of alumna, for example.

The magnetic head further includes a write head section 9 disposed over the nonmagnetic layers 50 and 60. The write head section 9 includes a first coil 11, a second coil 12, a third coil 13, a main pole 15, a write shield 16, and a gap part 17.

The first to third coils 11 to 13 produce magnetic fields corresponding to data to be written on a recording medium. The first to third coils 11 to 13 are each made of a conductive material such as copper. The main pole 15 has an end face located in the medium facing surface 80. The main pole 15 allows magnetic fluxes corresponding to the magnetic fields produced by the first to third coils 11 to 13 to pass, and produces a write magnetic field for writing data on a recording medium by means of a perpendicular magnetic recording system. FIG. 1 shows a cross section that intersects the end face of the main pole 15 located in the medium facing surface 80 and that is perpendicular to the medium facing surface 80 and to the top surface 1a of the substrate 1 (the cross section will hereinafter be referred to as the main cross section).

The write shield 16 has an end face located in the medium facing surface 80. The end face of the write shield 16 includes first to fourth end face portions 16Aa, 16Ba, 16Ca, and 16Da. The first end face portion 16Aa is located on the front side in the direction T of travel of the recording medium relative to the end face of the main pole 15. The second end face portion 16Ba is located on the rear side in the direction T of travel of the recording medium relative to the end face of the main pole 15. The third and fourth end face portions 16Ca and 16Da are located on opposite sides of the end face of the main pole 15 in the track width direction TW. In the medium facing surface 80, the first to fourth end face portions 16Aa, 16Ba, 16Ca, and 16Da are arranged to wrap around the end face of the main pole 15.

The write shield 16 is made of a magnetic material. Examples of materials that can be used for the write shield 16 include CoFeN, CoNiFe, NiFe, and CoFe.

The write head section 9 further includes a first return path section 40 and a second return path section 30. The first return path section 40 and the second return path section 30 are both made of a magnetic material. Examples of materials that can be used for the first return path section 40 and the second return path section 30 include CoFeN, CoNiFe, NiFe, and CoFe. The first return path section 40 and the second return path section 30 align along a direction perpendicular to the top surface 1a of the substrate 1 with the main pole 15 interposed therebetween. The first return path section 40 is located on the front side in the direction T of travel of the recording medium relative to the main pole 15. The second return path section 30 is located on the rear side in the direction T of travel of the recording medium relative to the main pole 15.

The second return path section 30 includes magnetic layers 31, 32, 33, 34, 35, and 36. The magnetic layer 31 is located on the nonmagnetic layer 50. The magnetic layers 32 and 33 are both located on the magnetic layer 31. The magnetic layer 32 is located near the medium facing surface 80. The magnetic layer 33 is located farther from the medium facing surface 80 than is the magnetic layer 32. The magnetic layers 31 and 32 have their respective end faces that face toward the medium facing surface 80. These end faces are located at a distance from the medium facing surface 80. As shown in FIG. 3, the third coil 13 is wound approximately three turns around the magnetic layer 33.

The magnetic head further includes an insulating layer 51 made of an insulating material and disposed over the nonmagnetic layers 50 and 60 to surround the magnetic layer 31, and an insulating layer 52 made of an insulating material and disposed over the magnetic layer 31 and the insulating layer 51. The third coil 13 is disposed on the insulating layer 52. The insulating layers 51 and 52 are made of alumina, for example.

The magnetic head further includes an insulating layer 53 made of an insulating material and disposed in the space between every adjacent turns of the third coil 13, and an insulating layer 54 made of an insulating material and disposed around the third coil 13 and the magnetic layer 32. The top surfaces of the third coil 13, the magnetic layers 32 and 33, and the insulating layers 53 and 54 are even with each other. The insulating layer 53 is made of photoresist, for example. The insulating layer 54 is made of alumina, for example.

The magnetic layer 34 is disposed over the magnetic layer 32 and the insulating layer 54. The magnetic layer 35 is disposed on the magnetic layer 33. The magnetic layer 34 has an end face located in the medium facing surface 80. The magnetic head further includes an insulating layer 55 made of an insulating material and disposed over the top surfaces of the third coil 13 and the insulating layers 53 and 54, and an insulating layer 56 made of an insulating material and disposed on the insulating layer 55 to surround the magnetic layers 34 and 35. The top surfaces of the magnetic layers 34 and 35 and the insulating layer 56 are even with each other. The insulating layers 55 and 56 are made of alumina, for example.

As shown in FIG. 2, the write shield 16 includes a first shield 16A, a second shield 16B, and two side shields 16C and 16D. The two side shields 16C and 16D are located on opposite sides of the main pole 15 in the track width direction TW. The first shield 16A is located on the front side in the direction T of travel of the recording medium relative to the main pole 15. The second shield 16B is located on the rear side in the direction T of travel of the recording medium relative to the main pole 15. The side shields 16C and 16D magnetically couple the first shield 16A and the second shield 16B to each other.

As shown in FIG. 1 and FIG. 2, the first shield 16A has: the first end face portion 16Aa; a top surface; a bottom surface; and a connecting surface connecting the first end face portion 16Aa and the top surface to each other. The distance from the medium facing surface 80 to an arbitrary point on the connecting surface increases with increasing distance from the arbitrary point to the top surface 1a of the substrate 1. As shown in FIG. 2, the second shield 16B has the second end face portion 16Ba. The side shield 16C has the third end face portion 16Ca. The side shield 16D has the fourth end face portion 16Da.

The second shield 16B is disposed on the magnetic layer 34. The magnetic layer 36 is disposed over the magnetic layer 35 and the insulating layer 56. The magnetic head further includes a nonmagnetic layer 57 made of a nonmagnetic material. The nonmagnetic layer 57 is disposed on part of the top surfaces of the magnetic layer 34 and the insulating layer 56, and surrounds the second shield 16B and the magnetic layer 36. The nonmagnetic layer 57 is made of alumina, for example.

The main pole 15 has a top surface (see FIG. 1), which is a surface located at the end on the front side in the direction T of travel of the recording medium, and a bottom end (see FIG. 1) opposite to the top surface. The main pole 15 further has first and second side parts (see FIG. 2) that are opposite to each other in the track width direction TW. The side shield 16C has a first sidewall opposed to the first side part of the main pole 15. The side shield 16D has a second sidewall opposed to the second side part of the main pole 15.

The gap part 17 is interposed between the main pole 15 and the write shield 16. The magnetic head further includes a first gap layer 19 made of a nonmagnetic material and a second gap layer 18 made of a nonmagnetic material. A portion of the first gap layer 19 constitutes a portion of the gap part 17. A portion of the second gap layer 18 constitutes another portion of the gap part 17. The portion of the first gap layer 19 constituting the portion of the gap part 17 is located between the main pole 15 and the first shield 16A. The portion of the second gap layer 18 constituting the other portion of the gap part 17 is located between the main pole 15 and each of the second shield 16B and the side shields 16C and 16D.

The side shields 16C and 16D are disposed on the second shield 16B and in contact with the top surface of the second shield 16B. The second gap layer 18 is arranged to extend along the sidewalls of the side shields 16C and 16D, the top surface of the second shield 16B and the top surface of the nonmagnetic layer 57. The nonmagnetic material employed to form the second gap layer 18 may be an insulating material or a nonmagnetic metal material. Alumina is an example of insulating materials that can be used to form the second gap layer 18. Ru is an example of nonmagnetic metal materials that can be used to form the second gap layer 18.

The main pole 15 is disposed over the second shield 16B and the nonmagnetic layer 57 such that the second gap layer 18 is interposed between the main pole 15 and the top surfaces of the second shield 16B and the nonmagnetic layer 57. As shown in FIG. 2, the second gap layer 18 is interposed also between the main pole 15 and each of the side shields 16C and 16D.

The bottom end of the main pole 15 is in contact with the top surface of the magnetic layer 36 at a position away from the medium facing surface 80. The main pole 15 is made of a magnetic metal material. Examples of materials that can be used for the main pole 15 include NiFe, CoNiFe, and CoFe. The shape of the main pole 15 will be described in detail later.

The magnetic head further includes a nonmagnetic layer 61 made of a nonmagnetic material and disposed around the main pole 15 and the side shields 16C and 16D. In the present embodiment, the nonmagnetic layer 61 is made of a nonmagnetic insulating material such as alumina, in particular.

The magnetic head further includes: a nonmagnetic metal layer 58 made of a nonmagnetic metal material and disposed on part of the top surface of the main pole 15 at a position away from the medium facing surface 80; and an insulating layer 59 made of an insulating material and disposed on the top surface of the nonmagnetic metal layer 58. The nonmagnetic metal layer 58 is made of Ru, NiCr, or NiCu, for example. The insulating layer 59 is made of alumina, for example.

The first gap layer 19 is disposed to cover the main pole 15, the nonmagnetic metal layer 58 and the insulating layer 59. The first gap layer 19 may be made of a nonmagnetic insulating material such as alumina or a nonmagnetic conductive material such as Ru, NiCu, Ta, W, NiB, or NiP.

The first shield 16A is disposed over the side shields 16C and 16D and the first gap layer 19, and is in contact with the top surfaces of the side shields 16C and 16D and the first gap layer 19. In the medium facing surface 80, part of the first end face portion 16Aa of the first shield 16A is spaced from the end face of the main pole 15 by a predetermined distance created by the thickness of the first gap layer 19. The thickness of the first gap layer 19 preferably falls within the range of 5 to 60 nm, and may be 30 to 60 nm, for example. The end face of the main pole 15 has a side that is adjacent to the first gap layer 19, and the side defines the track width.

The first return path section 40 includes a yoke part 41 and a coupling part 42. The yoke part 41 is magnetically connected to the write shield 16. The coupling part 42 lies on the main pole 15 at a position away from the medium facing surface 80, and magnetically couples the yoke part 41 and the main pole 15 to each other. The write head section 9 further includes a core part 71 and a magnetic layer 72 that are located on the front side in the direction T of travel of the recording medium relative to the main pole 15. The core part 71 is located farther from the medium facing surface 80 than is the coupling part 42, and lies on the main pole 15.

The core part 71 and the magnetic layer 72 are each made of a magnetic material. The material of the core part 71 and the magnetic layer 72 may be CoFeN, CoNiFe, NiFe, or CoFe, for example.

As shown in FIG. 4, the first coil 11 is wound approximately one turn around the coupling part 42. The second coil 12 is wound approximately two turns around the core part 71. The magnetic head further includes an insulating film 62 and an insulating layer 63 each made of an insulating material, and a not-shown nonmagnetic layer made of a nonmagnetic material. The insulating film 62 is interposed between the first coil 11 and each of the first shield 16A, the first gap layer 19, and the coupling part 42, and between the second coil 12 and the core part 71. The insulating layer 63 is disposed between the first coil 11 and the second coil 12 and in the space between adjacent turns of the second coil 12. The not-shown nonmagnetic layer is disposed around the first coil 11, the second coil 12, and the first shield 16A. The insulating film 62 and the not-shown nonmagnetic layer are made of alumina, for example. The insulating layer 63 is made of photoresist, for example. The top surfaces of the first coil 11, the second coil 12, the first shield 16A, the coupling part 42, the core part 71, the insulating film 62, the insulating layer 63, and the not-shown nonmagnetic layer are even with each other.

The magnetic head further includes an insulating layer 64 made of an insulating material and disposed over the top surfaces of the first coil 11, the second coil 12, the insulating film 62, and the insulating layer 63. The insulating layer 64 is made of alumina, for example.

The yoke part 41 is disposed over the first shield 16A, the coupling part 42 and the insulating layer 64, and connects the first shield 16A and the coupling part 42 to each other. The yoke part 41 has an end face facing toward the medium facing surface 80. This end face is located at a distance from the medium facing surface 80. The distance from the medium facing surface 80 to an arbitrary point on the end face of the yoke part 41 increases with increasing distance from the arbitrary point to the top surface 1a of the substrate 1.

The magnetic layer 72 is located farther from the medium facing surface 80 than is the yoke part 41, and lies over the core part 71 and the insulating layer 64. Note that the magnetic layer 72 is not an essential component of the write head section 9 and can be dispensed with.

The magnetic head further includes an insulating layer 65 made of an insulating material and disposed around the yoke part 41 and the magnetic layer 72. The insulating layer 65 is made of alumina, for example.

The magnetic head further includes a protective layer 70 made of a nonmagnetic material and disposed to cover the write head section 9. The protective layer 70 is made of, for example, an inorganic insulating material such as alumina.

As has been described, the magnetic head according to the present embodiment includes the medium facing surface 80, the read head section 8, and the write head section 9. The medium facing surface 80 faces a recording medium. The read head section 8 and the write head section 9 are stacked on the substrate 1. The read head section 8 is located on the rear side in the direction T of travel of the recording medium (i.e., located on the leading side) relative to the write head section 9.

The read head section 8 includes: the MR element 5 serving as the read element; the first read shield layer 3 and the second read shield layer 7 for shielding the MR element 5, with their respective portions near the medium facing surface 80 opposed to each other with the MR element 5 therebetween; the first read shield gap film 4 disposed between the MR element 5 and the first read shield layer 3; and the second read shield gap film 6 disposed between the MR element 5 and the second read shield layer 7.

The write head section 9 includes the first to third coils 11 to 13, the main pole 15, the write shield 16, the gap part 17, the first return path section 40, the second return path section 30, and the core part 71. The write shield 16 includes the first shield 16A, the second shield 16B, and the two side shields 16C and 16D. The gap part 17 is composed of part of the first gap layer 19 and part of the second gap layer 18. The first return path section 40 and the second return path section 30 align along the direction perpendicular to the top surface 1a of the substrate 1 with the main pole 15 interposed therebetween.

The first return path section 40 includes the yoke part 41 and the coupling part 42, and is located on the front side in the direction T of travel of the recording medium relative to the main pole 15. As shown in FIG. 1, the main pole 15, the gap part 17 (part of the gap layer 19), the write shield 16, the yoke part 41, and the coupling part 42 form a first space S1 enclosed by these components.

The first coil 11 is located on the front side in the direction T of travel of the recording medium relative to the main pole 15 and wound around the coupling part 42. Part of the first coil 11 passes through the first space S1. The second coil 12 is located on the front side in the direction T of travel of the recording medium relative to the main pole 15 and wound around the core part 71.

The second return path section 30 includes the magnetic layers 31 to 36, and is located on the rear side in the direction T of travel of the recording medium relative to the main pole 15. As shown in FIG. 1, the second return path section 30 connects the write shield 16 and part of the main pole 15 away from the medium facing surface 80 to each other so as to form a second space S2 enclosed by the main pole 15, the gap part 17 (part of the gap layer 18), the write shield 16, and the second return path section 30 (the magnetic layers 31 to 36).

The first to third coils 11 to 13 will now be described with reference to FIG. 3 to FIG. 5. FIG. 3 is a plan view showing the third coil 13. The third coil 13 includes a third winding portion 13A having a planar spiral shape, and is wound approximately three turns around the magnetic layer 33 which constitutes part of the second return paths section 30. The third winding portion 13A passes through the second space S2. The third coil 13 has a coil connection part 13S electrically connected to the first coil 11 and a coil connection part 13E electrically connected to the second coil 12. As viewed from above, the third winding portion 13A is wound in a counterclockwise direction from the coil connection part 13S to the coil connection part 13E.

FIG. 4 is a plan view showing the first and second coils 11 and 12. The first coil 11 includes a lead portion 11L, and a first winding portion 11A having a planar spiral shape and contiguous with the lead portion 11L. In FIG. 4, the boundary between the lead portion 11L and the first winding portion 11A is shown by a broken line. The first winding portion 11A is wound approximately one turn around the coupling part 42. The first winding portion 11A passes through the first space S1, particularly between the first shield 16A and the coupling part 42. The coupling part 42 has an end closest to the medium facing surface 80. The distance from the medium facing surface 80 to the end of the coupling part 42 is in the range of 0.6 to 1.6 µm.

The first winding portion 11A has a coil connection part 11E electrically connected to the coil connection part 13S of the third coil 13. As viewed from above, the first winding portion 11A is wound in a clockwise direction from the boundary between the first winding portion 11A and the lead portion 11L to the coil connection part 11E. The coil connection part 11E is electrically connected to the coil connection part 13S via a connection layer 91 of columnar shape that penetrates a plurality of layers interposed between the first coil 11 and the third coil 13. The connection layer 91 is made of a conductive material such as copper.

The second coil 12 includes a lead portion 12L, and a second winding portion 12A having a planar spiral shape and contiguous with the lead portion 12L. In FIG. 4, the boundary between the lead portion 12L and the second winding portion 12A is shown by a broken line. The second winding portion 12A is wound approximately two turns around the core part 71. The first winding portion 11A and the second winding portion 12A are located in one plane. The second winding portion 12A has a coil connection part 12S electrically connected to the coil connection part 13E of the third coil 13. As viewed from above, the second winding portion 12A is wound in a clockwise direction from the coil connection part 12S to the boundary between the second winding portion 12A and the lead portion 12L. The coil connection part 12S is electrically connected to the coil connection part 13E via a connection layer 92 of columnar shape that penetrates a plurality of layers interposed between the second coil 12 and the third coil 13. The connection layer 92 is made of a conductive material such as copper.

In the example shown in FIG. 5, the first to third coils 11 to 13 are connected in series in the order of the first coil 11, the third coil 13, and the second coil 12.

The shape of the main pole 15 will now be described in detail with reference to FIG. 1 and FIG. 3 to FIG. 5. The main pole 15 includes a first portion 15A, and a second portion 15B that is located farther from the medium facing surface 80 than is the first portion 15A and connected to the first portion 15A. In FIG. 1, the boundary between the first portion 15A and the second portion 15B is shown by a dotted line. The coupling part 42 is directly connected to the first portion 15A of the main pole 15. The core part 71 is directly connected to the second portion 15B of the main pole 15.

As shown in FIG. 3 and FIG. 4, the first portion 15A includes a track width defining portion 15A1 and a wide portion 15A2. The track width defining portion 15A1 has an end face located in the medium facing surface 80, and an end opposite to the end face. The wide portion 15A2 is connected to the end of the track width defining portion 15A1. As shown in FIG. 1, the main pole 15 has: the top surface located at the end on the front side in the direction T of travel of the recording medium; the bottom end opposite to the top surface; the first side part; and the second side part. The width of the top surface in the track width direction TW is greater in the wide portion 15A2 than in the track width defining portion 15A1. The width of the top surface in the track width direction TW in the second portion 15B is the same as that in the wide portion 15A2.

In the track width defining portion 15A1, the width of the top surface in the track width direction TW is generally constant regardless of the distance from the medium facing surface 80. In the wide portion 15A2, the width of the top surface in the track width direction TW is, for example, equal to that in the track width defining portion 15A1 when seen at the boundary between the track width defining portion 15A1 and the wide portion 15A2, and gradually increases with increasing distance from the medium facing surface 80, then becoming constant. Here, the length of the track width defining portion 15A1 in the direction perpendicular to the medium facing surface 80 will be referred to as the neck height. The neck height falls within the range of 0 to 0.3 µm, for example. A zero neck height means that no track width defining portion 15A1 exists and an end face of the wide portion 15A2 is thus located in the medium facing surface 80.

In the first portion 15A, the top surface includes an inclined portion and a horizontal portion that are contiguously arranged in this order, the inclined portion being closer to the medium facing surface 80. The inclined portion has a first end located in the medium facing surface 80 and a second end opposite to the first end. The horizontal portion is connected to the second end of the inclined portion. The inclined portion is inclined such that its second end is located on the front side in the direction T of travel of the recording medium relative to its first end. The bottom surface of the first shield 16A includes a portion that is opposed to the inclined portion with the first gap layer 19 constituting part of the gap part 17 interposed therebetween.

In the first portion 15A, the bottom end includes a first inclined portion, a first horizontal portion, a second inclined portion, and a second horizontal portion that are contiguously arranged in this order, the first inclined portion being closest to the medium facing surface 80. The first inclined portion has a first end located in the medium facing surface 80 and a second end opposite to the first end. The first horizontal portion is connected to the second end of the first inclined portion. The second inclined portion has a first end connected to the first horizontal portion, and a second end that is located farther from the medium facing surface 80 than is the first end. Each of the first inclined portion, the first horizontal portion, and the second inclined portion may be an edge formed by two intersecting planes, or may be a plane connecting two planes to each other. The second horizontal portion is a plane connected to the second end of the second inclined portion. The first and second inclined portions are inclined such that their respective second ends are located on the rear side in the direction T of travel of the recording medium relative to their respective first ends. The first and second horizontal portions extend in a direction substantially perpendicular to the medium facing surface 80.

The end face of the main pole 15 located in the medium facing surface 80 has a first side adjacent to the first gap layer 19, a second side connected to one end of the first side, and a third side connected to the other end of the first side. The first side defines the track width. The position of an end of a record bit to be recorded on a recording medium depends on the position of the first side. The end face of the main pole 15 located in the medium facing surface 80 decreases in width in the track width direction TW with increasing distance from the first side, that is, with increasing proximity to the top surface 1a of the substrate 1. Each of the second side and the third side forms an angle of, for example, 7° to 17°, or preferably 10° to 15°, relative to the direction perpendicular to the top surface 1a of the substrate 1. The first side has a length in the range of 0.05 to 0.20 μm, for example.

The function and effects of the magnetic head according to the present embodiment will now be described. The magnetic head writes data on a recording medium by using the write head section 9 and reads data stored on the recording medium by using the read head section 8. In the write head section 9, the first to third coils 11 to 13 produce magnetic fields corresponding to data to be written on a recording medium. As shown in FIG. 1, a magnetic flux corresponding to the magnetic field produced by the first coil 11 passes through the first return path section 40 and the main pole 15. A magnetic flux corresponding to the magnetic field produced by the second coil 12 passes through the magnetic layer 72, the core part 71, and the main pole 15. The magnetic layer 72 has the function of concentrating magnetic flux so that more magnetic flux passes through the core part 71. A magnetic flux corresponding to the magnetic field produced by the third coil 13 passes through the second return path section 30 and the main pole 15. Consequently, the main pole 15 allows the magnetic flux corresponding to the magnetic field produced by the first coil 11, the magnetic flux corresponding to the magnetic field produced by the second coil 12, and the magnetic flux corresponding to the magnetic field produced by the third coil 13 to pass therethrough.

The first to third coils 11 to 13 are connected such that the magnetic fluxes corresponding to the magnetic fields produced by the first to third coils 11 to 13 flow in the same direction through the main pole 15. In the present embodiment, the first to third coils 11 to 13 are connected in series.

The main pole 15 allows the magnetic fluxes corresponding to the magnetic fields produced by the first to third coils 11 to 13 to pass as mentioned above, and produces a write magnetic field for writing data on a recording medium by means of the perpendicular magnetic recording system.

The write shield 16 captures a disturbance magnetic field applied to the magnetic head from the outside thereof. This makes it possible to prevent erroneous writing on a recording medium induced by the disturbance magnetic field intensively captured into the main pole 15. The write shield 16 also has the function of capturing a magnetic flux produced from the end face of the main pole 15 and spreading in directions other than the direction perpendicular to the plane of the recording medium, so as to prevent the magnetic flux from reaching a recording medium.

Furthermore, the write shield 16, the first return path section 40, and the second return path section 30 have the function of allowing a magnetic flux that has been produced from the end face of the main pole 15 and has magnetized a recording medium to flow back. More specifically, a part of the magnetic flux that has been produced from the end face of the main pole 15 and has magnetized a recording medium flows back to the main pole 15 through the write shield 16 and the first return path section 40. Another part of the magnetic flux that has been produced from the end face of the main pole 15 and has magnetized the recording medium flows back to the main pole 15 through the write shield 16 and the second return path section 30.

The write shield 16 includes the first shield 16A, the second shield 16B, and the two side shields 16C and 16D. The present embodiment thus makes it possible that, in regions on both the front side and the rear side in the direction T of travel of a recording medium relative to the end face of the main pole 15 and regions on opposite sides of the end face of the main pole 15 in the track width direction TW, a magnetic flux that is produced from the end face of the main pole 15 and spreads in directions other than the direction perpendicular to the plane of the recording medium can be captured and thereby prevented from reaching the recording medium. Consequently, the present embodiment makes it possible to prevent adjacent track erasure induced by a skew. The first and second shields 16A and 16B contribute not only to the prevention of adjacent track erasure induced by a skew but also to an increase in the gradient of the write magnetic field. The side shields 16C and 16D greatly contribute to the prevention of adjacent track erasure, in particular. According to the present embodiment, such functions of the write shield 16 serve to increase the recording density.

Furthermore, as shown in FIG. 2, the present embodiment is configured so that in the medium facing surface 80, the distance between the first and second side parts of the main pole 15 in the track width direction TW, i.e., the width of the end face of the main pole 15, decreases with increasing proximity to the top surface 1a of the substrate 1. According to the present embodiment, this feature also serves to prevent adjacent track erasure induced by a skew.

The present embodiment is also configured so that in the medium facing surface 80, the distance between the first and second sidewalls of the side shields 16C and 16D in the track width direction TW decreases with increasing proximity to the top surface 1a of the substrate 1, as does the distance between the first and second side parts of the main pole 15. The present embodiment thus allows both the distance between the first side part and the first sidewall and the distance between the second side part and the second sidewall to be small and constant in the medium facing surface 80. This configuration allows the side shields 16C and 16D to efficiently capture the magnetic flux that is produced from the end face of the main pole 15 and spreads out to opposite areas in the track width direction TW. Consequently, according to the present embodiment, it is possible to enhance the function of the side shields 16C and 16D in particular, and to thereby enable more effective prevention of adjacent track erasure induced by a skew.

The write shield 16 cannot capture much magnetic flux if the write shield 16 is not magnetically connected with any magnetic layer having a sufficiently large volume enough to accommodate the magnetic flux captured by the write shield 16. In the present embodiment, there are provided the first return path section 40 (the yoke part 41 and the coupling part 42) which magnetically couples the first shield 16A of the write shield 16 and the main pole 15 to each other, and the second return path section 30 (the magnetic layers 31 to 36) which magnetically couples the second shield 16B of the write shield 16 and the main pole 15 to each other. Such a configuration allows the magnetic flux captured by the write shield 16 to flow into the main pole 15 by way of the first return path section 40 and the second return path section 30. In the present embodiment, the first return path section 40, the second return path section 30, and the main pole 15, which are magnetic layers large in volume, are magnetically connected to the write shield 16. This allows the write shield 16 to capture much magnetic flux, so that the above-described effect of the write shield 16 can be exerted effectively.

In the present embodiment, a part of the first portion 15A of the main pole 15 that is located in the vicinity of the medium facing surface 80 decreases in thickness toward the medium facing surface 80. This allows the main pole 15 to have a small thickness in the medium facing surface 80, thereby allowing the prevention of adjacent track erasure induced by a skew. On the other hand, since a portion of the main pole 15 away from the medium facing surface 80 can have a large thickness, it is possible for the main pole 15 to direct much magnetic flux to the medium facing surface 80, and this allows the improvement of write characteristics such as overwrite property.

Additionally, as the frequency of a recording signal is increased in order to increase the recording density, the magnetic head is required to be improved in the rate of change in the direction of the magnetic flux produced from the end face of the main pole 15. The position of an end of a record bit depends on the position of an end of the end face of the main pole 15 located in the medium facing surface 80, the end being located on the front side in the direction T of travel of the recording medium. To increase the recording density, it is therefore required to improve the rate of change in the direction of the magnetic flux passing through the first shield 16A as well as to improve the rate of change in the direction of the magnetic flux produced from the end face of the main pole 15. To meet these requirements, it is effective to reduce the length of a magnetic path that passes through the first shield 16A and the main pole 15. In the present embodiment, there is provided the first return path section 40 for connecting the main pole 15 and the first shield 16A to each other. This allows the length of the aforementioned magnetic path to be shorter than in the case where the first return path section 40 is not provided.

In the present embodiment, the number of turns of the first coil 11 passing through the first space S1 is approximately one. The present embodiment makes it possible to reduce the length of the magnetic path passing through the first shield 16A and the main pole 15 by configuring the first coil 11 to have a small number of turns. Consequently, it is possible to improve both the rate of change in the direction of the magnetic flux produced from the end face of the main pole 15 and the rate of change in the direction of the magnetic flux passing through the first shield 16A, thereby allowing the enhancement of the recording density.

However, merely configuring the first coil 11 to have a small number of turns will result in a reduction in the magnetomotive force provided by the first coil 11, so that the main pole 15 will become unable to produce a write magnetic field of sufficient magnitude. To address this problem, the present embodiment is provided with the core part 71 and the second coil 12 in addition to the first return path section 40 and the first coil 11. Consequently, even if the number of turns of the first coil 11 is reduced to reduce the length of the first return path section 40, the magnetomotive forces of the first coil 11 and the second coil 12 allow the main pole 15 to produce a write magnetic field of sufficient magnitude.

In the present embodiment, the number of turns of the second coil 12 is approximately two, and the number of turns of the first coil 11 is approximately one, in particular. Now, a magnetic head of a comparative example in which the second coil 12 is not provided and the number of turns of the first coil 11 is three will be contemplated. In the magnetic head of the comparative example, the main pole 15 does not have the second portion 15B. Furthermore, the magnetic head of the comparative example does not have the core part 71 and the magnetic layer 72. The remainder of configuration of the magnetic head of the comparative example is the same as that of the magnetic head according to the present embodiment. The total magnetomotive force produced by the first and second coils 11 and 12 in the present embodiment is almost equal to the magnetomotive force produced by the first coil 11 in the magnetic head of the comparative example. On the other hand, the present embodiment allows the magnetic path passing through the first shield 16A and the main pole 15 to be smaller in length because the number of turns of the first coil 11 is smaller than that in the magnetic head of the comparative example. Thus, when compared with the magnetic head of the comparative example, the present embodiment allows a reduction in length of the magnetic path passing through the first shield 16A and the main pole 15, while allowing the magnitude of the write magnetic field produced by the main pole 15 to be equivalent to that in the magnetic head of the comparative example.

Furthermore, in the present embodiment, the number of turns of the second coil 12 can be increased without being restricted by the number of turns of the first coil 11. The number of turns of the second coil 12 may be no smaller than that of the first coil 11, or may be greater than that of the first coil 11. By increasing the number of turns of the second coil 12 in this manner, the second coil 12 can provide an increased magnetomotive force.

Furthermore, in the present embodiment, the second return path section 30 and the third coil 13 are provided on the rear side in the direction T of travel of the recording medium relative to the main pole 15. The number of turns of the third coil 13 may be no smaller than that of the second coil 12, or may be greater than that of the second coil 12. In the present embodiment, the number of turns of the third coil 13 is approximately three, in particular, thus being greater than the number of turns of the second coil 12. In the present embodiment, the number of turns of the third coil 13 can be increased without being restricted by the number of turns of the first coil 11. According to the present embodiment, the magnetomotive force of the third coil 13 thus allows the main pole 15 to produce a write magnetic field of sufficient magnitude.

As can be seen from the foregoing, the present embodiment allows the main pole 15 to produce a write magnetic field of sufficient magnitude while allowing a reduction in length of the first return path section 40 which is located on the front side in the direction T of travel of a recording medium relative to the main pole 15.

In the present embodiment, the first winding portion 11A of the first coil 11 and the second winding portion 12A of the second coil 12 are located in one plane. According to the present embodiment, it is therefore easy to form the first and second coils 11 and 12.

Second Embodiment

Figure 6:
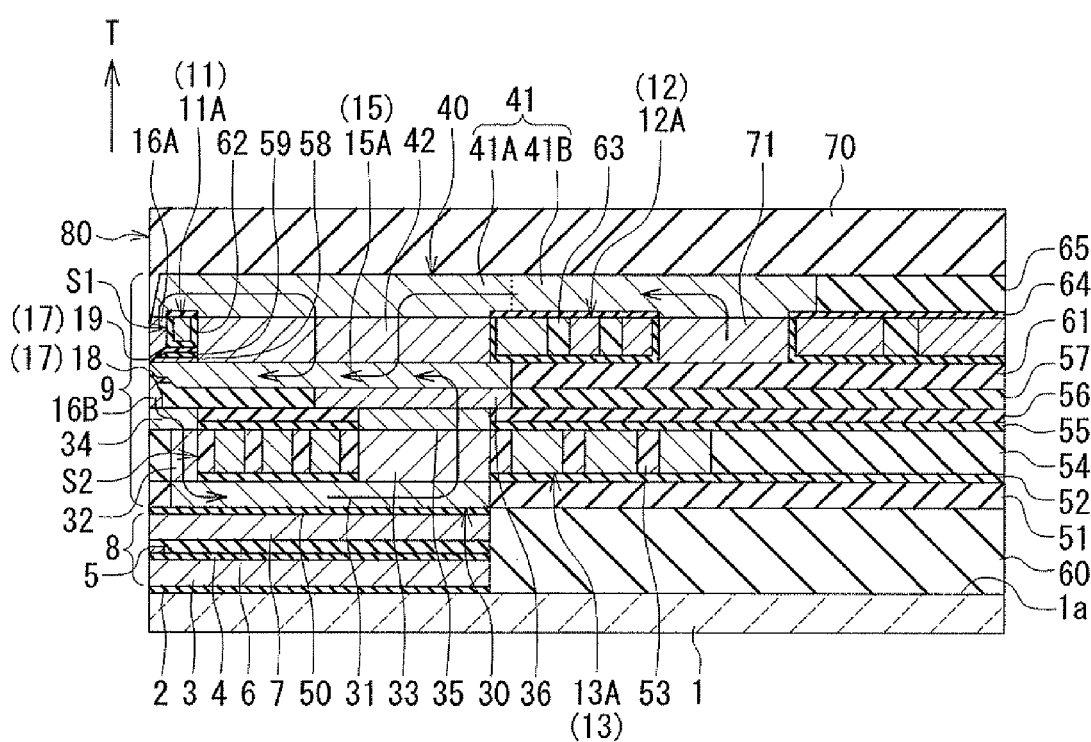
FIG. 6 is a cross-sectional view of a magnetic head according to a second embodiment of the invention.
Figure 7:
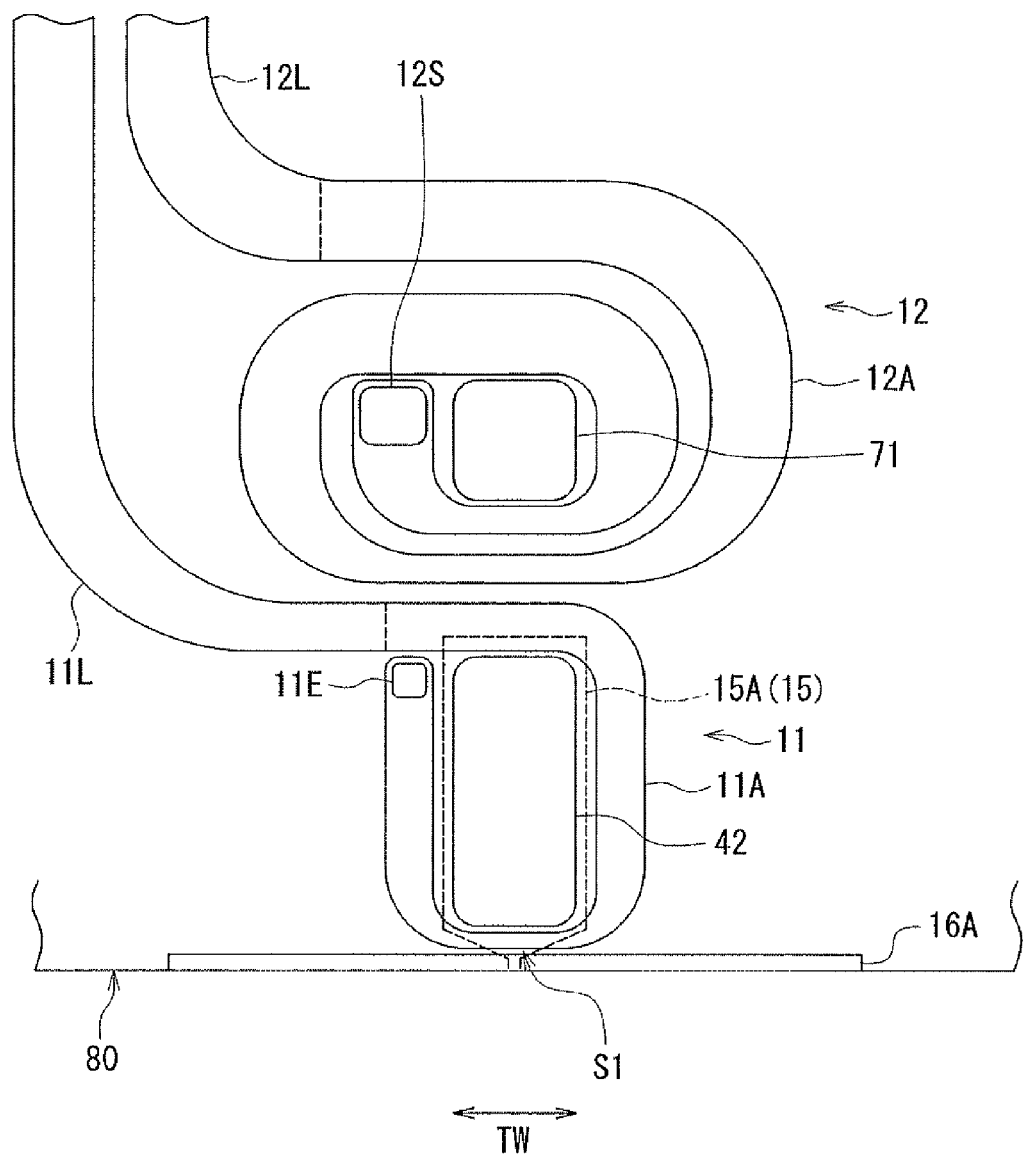
FIG. 7 is a plan view showing first and second coils of the magnetic head according to the second embodiment of the invention.
Figure 8:
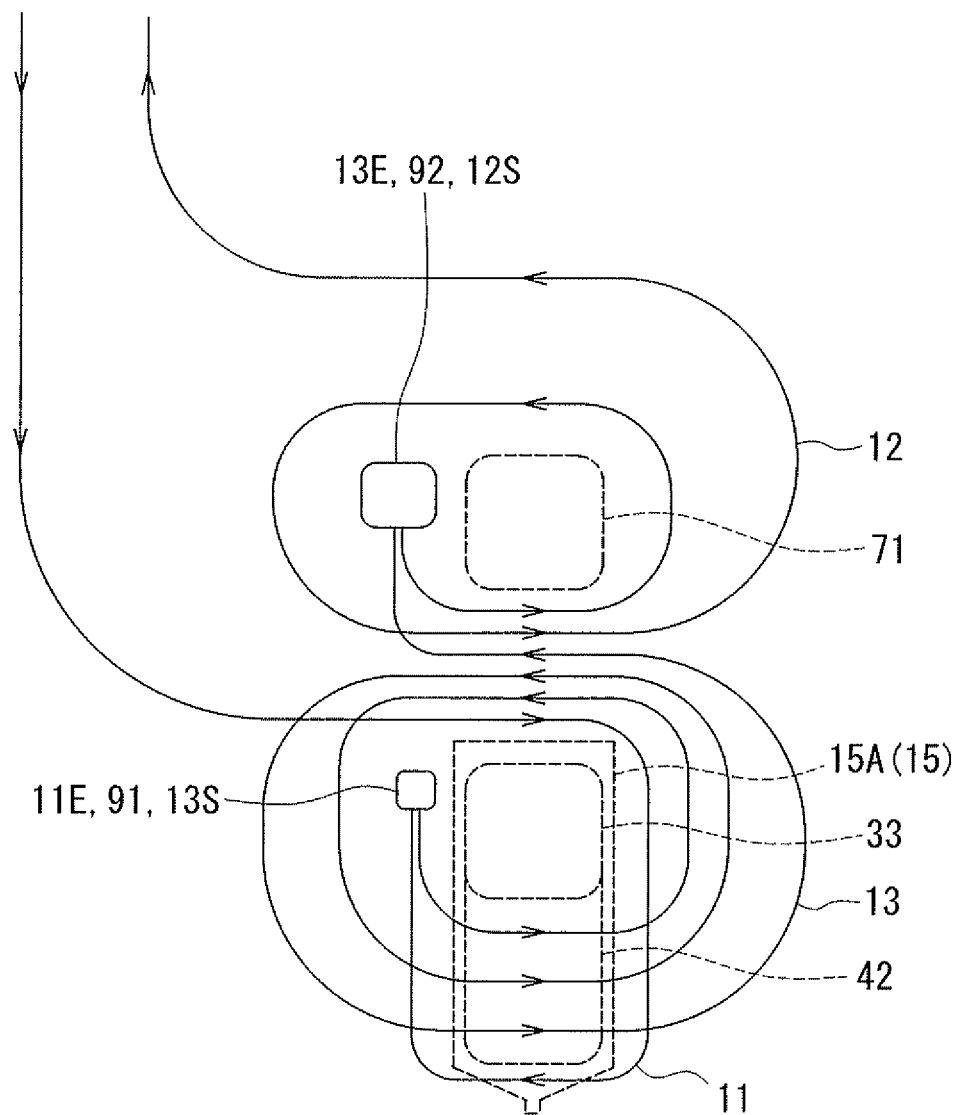
FIG. 8 is an explanatory diagram illustrating how the first to third coils are arranged and connected in the magnetic head according to the second embodiment of the invention.

A magnetic head according to a second embodiment of the invention will now be described with reference to FIG. 6 to FIG. 8. FIG. 6 is a cross-sectional view of the magnetic head according to the present embodiment. Note that FIG. 6 shows a cross section perpendicular to the medium facing surface and to the top surface of the substrate, or the main cross section, in particular. The arrows drawn within the magnetic head in FIG. 6 indicate the flows of magnetic fluxes. FIG. 7 is a plan view showing first and second coils of the magnetic head according to the present embodiment. FIG. 8 is an explanatory diagram illustrating how the first to third coils are arranged and connected in the magnetic head according to the present embodiment.

The configuration of the magnetic head according to the present embodiment is different from that of the magnetic head according to the first embodiment in the following respects. The magnetic head according to the present embodiment is without the magnetic layer 72. Furthermore, of the first and second portions 15A and 15B of the main pole 15, the second portion 15B is not provided.

In the present embodiment, the yoke part 41 includes a first portion 41A, and a second portion 41B that is located farther from the medium facing surface 80 than is the first portion 41A and connected to the first portion 41A. In FIG. 6, the boundary between the first portion 41A and the second portion 41B is shown by a dotted line. The coupling part 42 is directly connected to the first portion 41A of the yoke part 41. The core part 71 is directly connected to the second portion 41B of the yoke part 41 and magnetically connected to the main pole 15 via the yoke part 41 and the coupling part 42. As viewed from above, the second winding portion 12A is wound in a counterclockwise direction from the coil connection part 12S to the boundary between the second winding portion 12A and the lead portion 12L.

In the present embodiment, as shown in FIG. 6, a magnetic flux corresponding to the magnetic field produced by the second coil 12 passes through the core part 71, the yoke part 41, the coupling part 42, and the main pole 15 in this order. The remainder of configuration, function and effects of the present embodiment are similar to those of the first embodiment.

Third Embodiment

Figure 9:
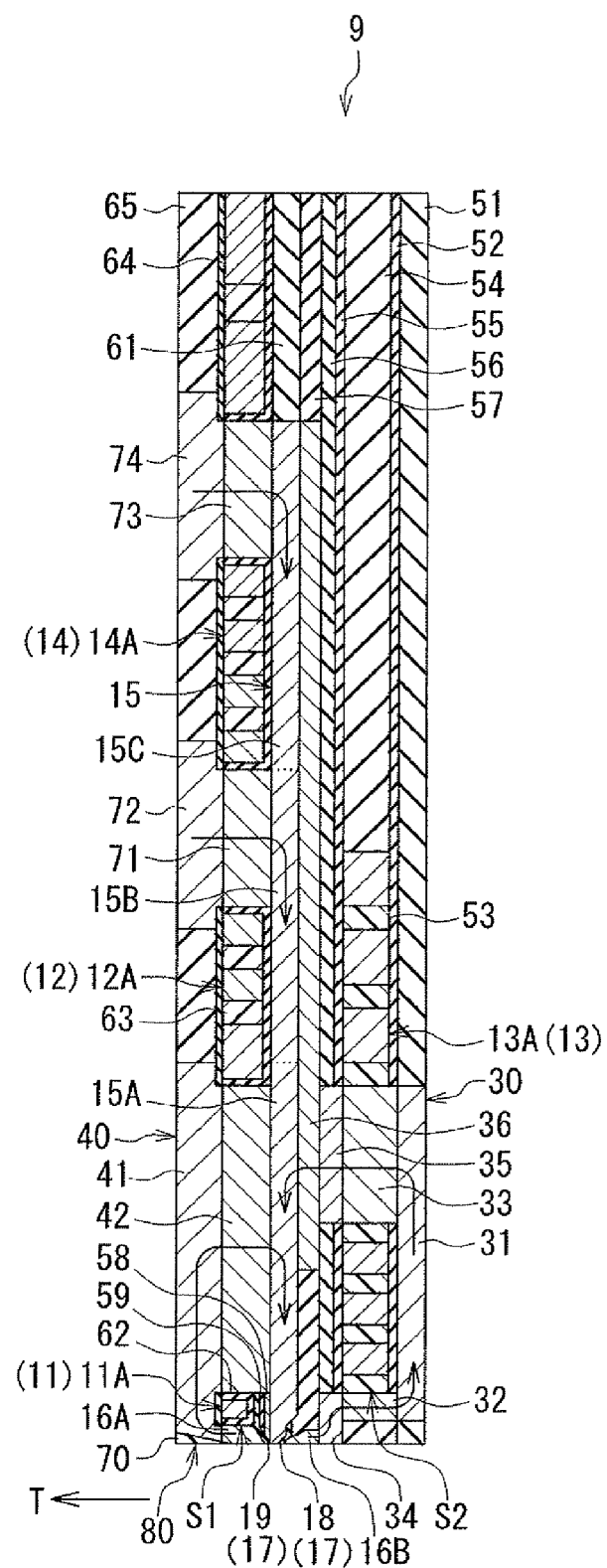
FIG. 9 is a cross-sectional view of a magnetic head according to a third embodiment of the invention.
Figure 10:
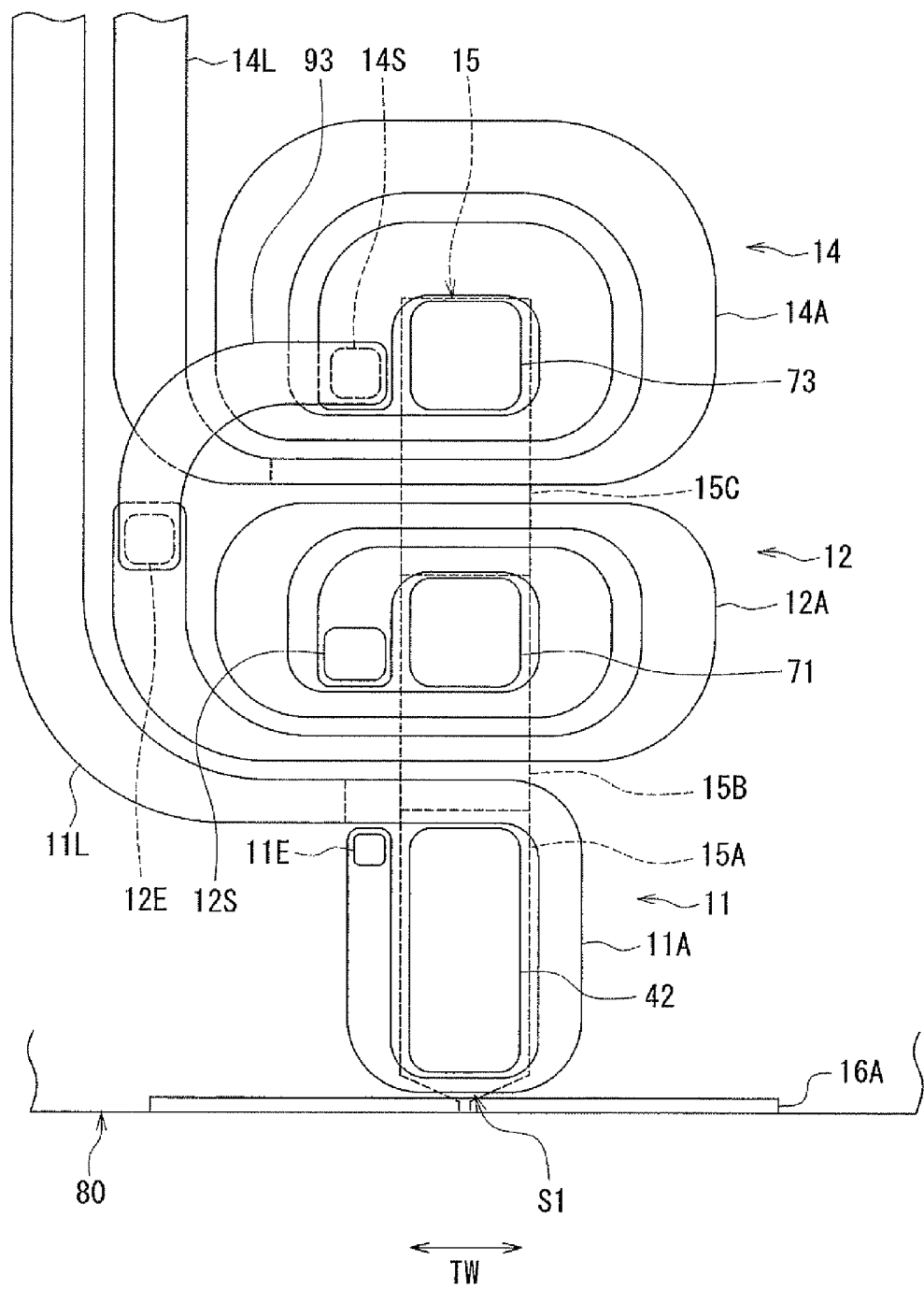
FIG. 10 is a plan view showing first, second, and fourth coils of the magnetic head according to the third embodiment of the invention.

A magnetic head according to a third embodiment of the invention will now be described with reference to FIG. 9 to FIG. 11. FIG. 9 is a cross-sectional view showing the write head section of the magnetic head according to the present embodiment. Note that FIG. 9 shows a cross section perpendicular to the medium facing surface and to the top surface of the substrate, or the main cross section, in particular. The arrows drawn within the magnetic head in FIG. 9 indicate the flows of magnetic fluxes. FIR. 10 is a plan view showing first, second and fourth coils of the magnetic head according to the present embodiment. FIR. 11 is an explanatory diagram illustrating how the first to fourth coils are arranged and connected in the magnetic head according to the present embodiment.

The configuration of the magnetic head according to the present embodiment is different from that of the magnetic head according to the first embodiment in the following respects. The magnetic head according to the present embodiment is provided with a fourth coil 14, a core part 73, and a magnetic layer 74. The fourth coil 14 is made of a conductive material such as copper. The core part 73 and the magnetic layer 74 are each made of a magnetic material. The material of the core part 73 and the magnetic layer 74 may be CoFeN, CoNiFe, NiFe, or CoFe, for example. In the present embodiment, the second coil 12 does not include the lead portion 12L.

The core part 73 is located farther from the medium facing surface 80 than is the core part 71 and magnetically connected to the main pole 15. The main pole 15 includes not only the first and second portions 15A and 15B mentioned in the description of the first embodiment but also a third portion 15C. The third portion 15C is located farther from the medium facing surface 80 than is the second portion 15B and connected to the second portion 15B. In FIG. 9, the boundaries between the first to third portions 15A to 15C are shown by dotted lines. The core part 73 is directly connected to the third portion 15C of the main pole 15. The fourth coil 14 is located on the front side in the direction T of travel of the recording medium relative to the main pole 15, and is wound approximately two turns around the core part 73.

The fourth coil 14 includes a lead portion 14L, and a fourth winding portion 14A having a planar spiral shape and contiguous with the lead portion 14L. In FIG. 10, the boundary between the lead portion 14L and the fourth winding portion 14A is shown by a broken line. The first winding portion 11A, the second winding portion 12A, and the fourth winding portion 14A are located in one plane. In the present embodiment, the second coil 12 has a coil connection part 12E. As viewed from above, the second winding portion 12A is wound in a clockwise direction from the coil connection part 12S to the coil connection part 12E. The fourth coil 14 has a coil connection part 14S electrically connected to the coil connection part 12E of the second coil 12. As viewed from above, the fourth winding portion 14A is wound in a clockwise direction from the coil connection part 14S to the boundary between the fourth winding portion 14A and the lead portion 14L. The coil connection part 14S is electrically connected to the coil connection part 12E via a lead layer 93 disposed above the second and fourth coils 12 and 14. The lead layer 93 is made of a conductive material such as copper.

Figure 11:
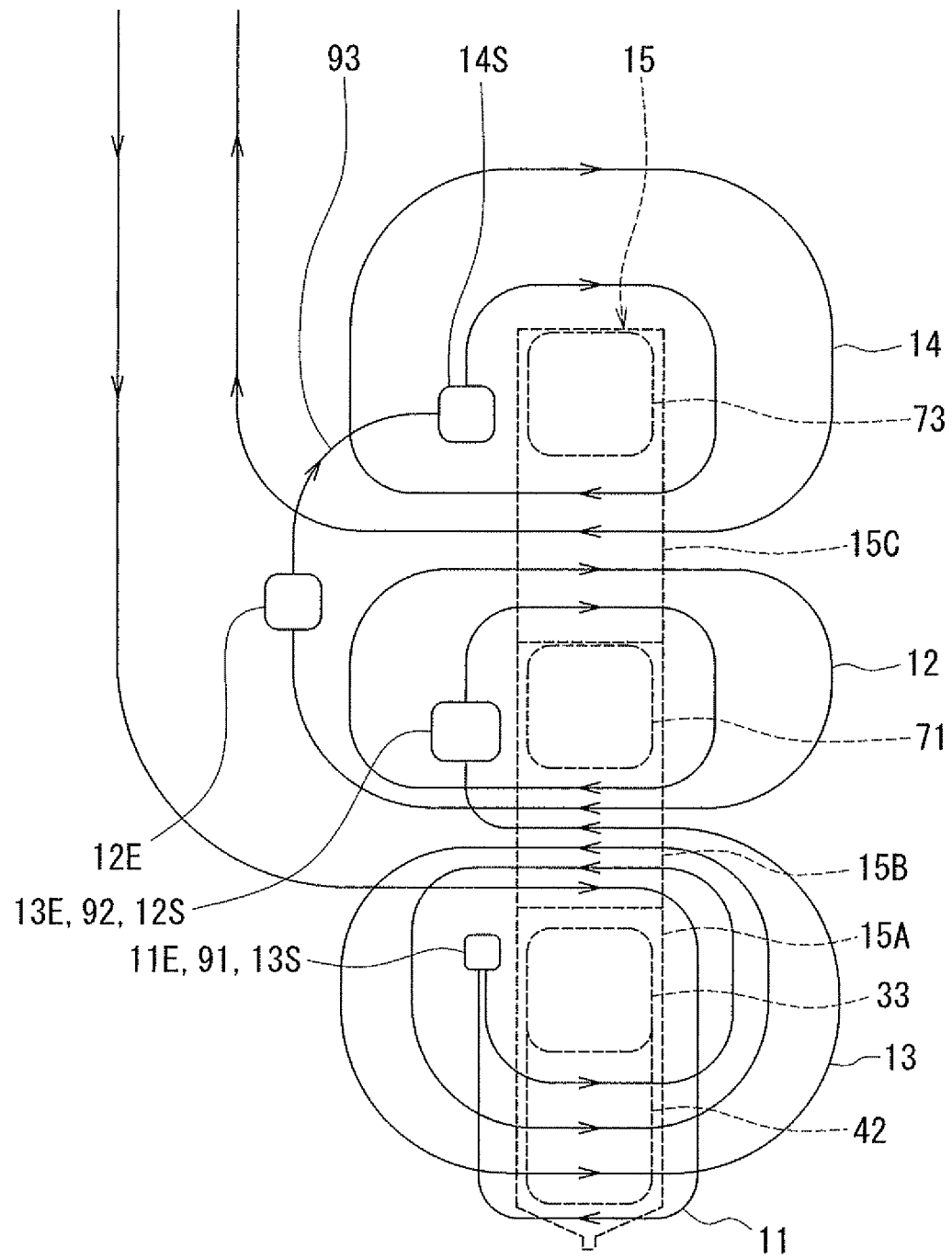
FIG. 11 is an explanatory diagram illustrating how the first to fourth coils are arranged and connected in the magnetic head according to the third embodiment of the invention.

In the example shown in FIG. 11, the first to fourth coils 11 to 14 are connected in series in the order of the first coil 11, the third coil 13, the second coil 12, and the fourth coil 14.

In the present embodiment, the insulating film 62 is interposed between the first coil 11 and each of the first shield 16A, the first gap layer 19, and the coupling part 42, between the second coil 12 and the core part 71, and between the fourth coil 14 and the core part 73. The insulating layer 63 is disposed between the first coil 11 and the second coil 12, between the second coil 12 and the fourth coil 14, and in the space between adjacent turns of each of the second and fourth coils 12 and 14. The not-shown nonmagnetic layer mentioned in the description of the first embodiment is disposed around the first coil 11, the second coil 12, the fourth coil 14, and the first shield 16A. The top surfaces of the first coil 11, the second coil 12, the fourth coil 14, the first shield 16A, the coupling part 42, the core parts 71 and 73, the insulating film 62, the insulating layer 63, and the not-shown nonmagnetic layer are even with each other. The insulating layer 64 is disposed over the top surfaces of the first coil 11, the second coil 12, the fourth coil 14, the insulating film 62, and the insulating layer 63.

The lead layer 93 is located on the insulating layer 64. The magnetic layer 74 is located farther from the medium facing surface 80 than is the magnetic layer 72, and lies over the core part 73 and the insulating layer 64. Note that the magnetic layer 74 is not an essential component of the magnetic head and can be dispensed with.

As shown in FIG. 9, a magnetic flux corresponding to the magnetic field produced by the fourth coil 14 passes through the magnetic layer 74, the core part 73, and the main pole 15. The magnetic layer 74 has the function of concentrating magnetic flux so that more magnetic flux passes through the core part 73.

According to the present embodiment, the magnetomotive forces of the first to fourth coils 11 to 14 allow the main pole 15 to produce a write magnetic field of sufficient magnitude. The remainder of configuration, function and effects of the present embodiment are similar to those of the first embodiment.

Fourth Embodiment

Figure 12:
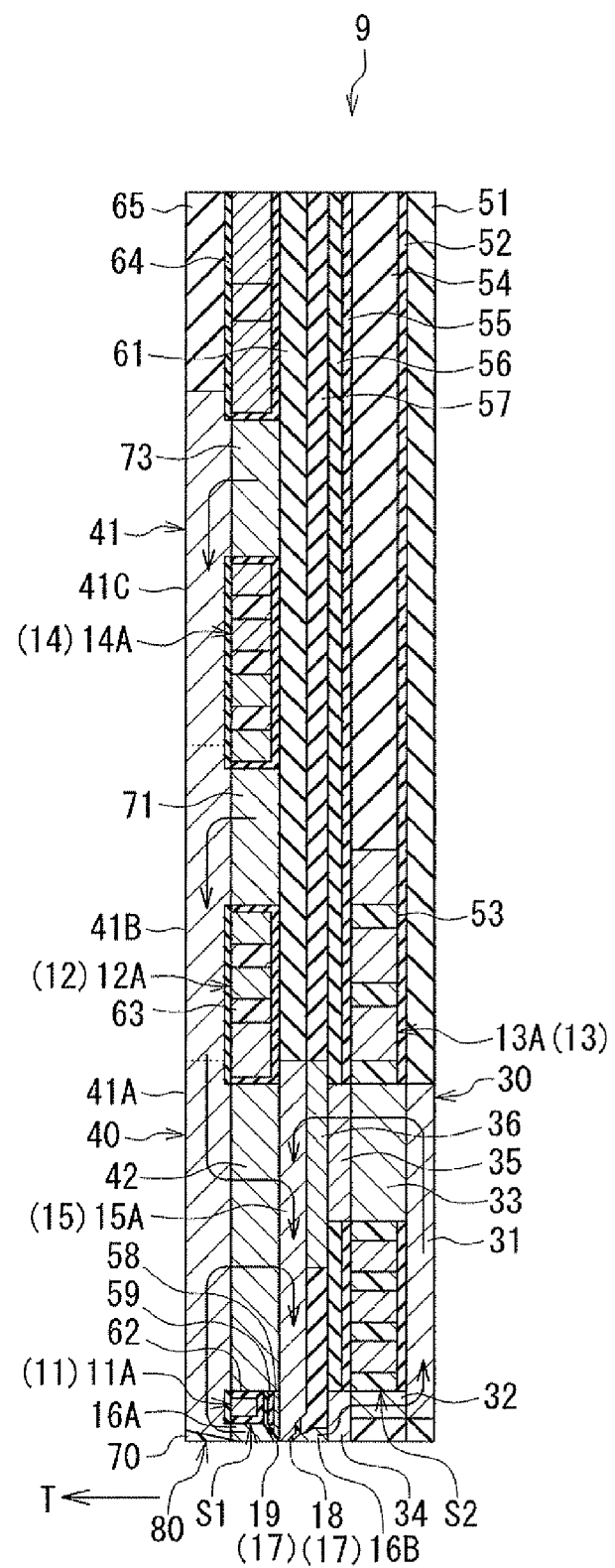
FIG. 12 is a cross-sectional view of a magnetic head according to a fourth embodiment of the invention.
Figure 13:
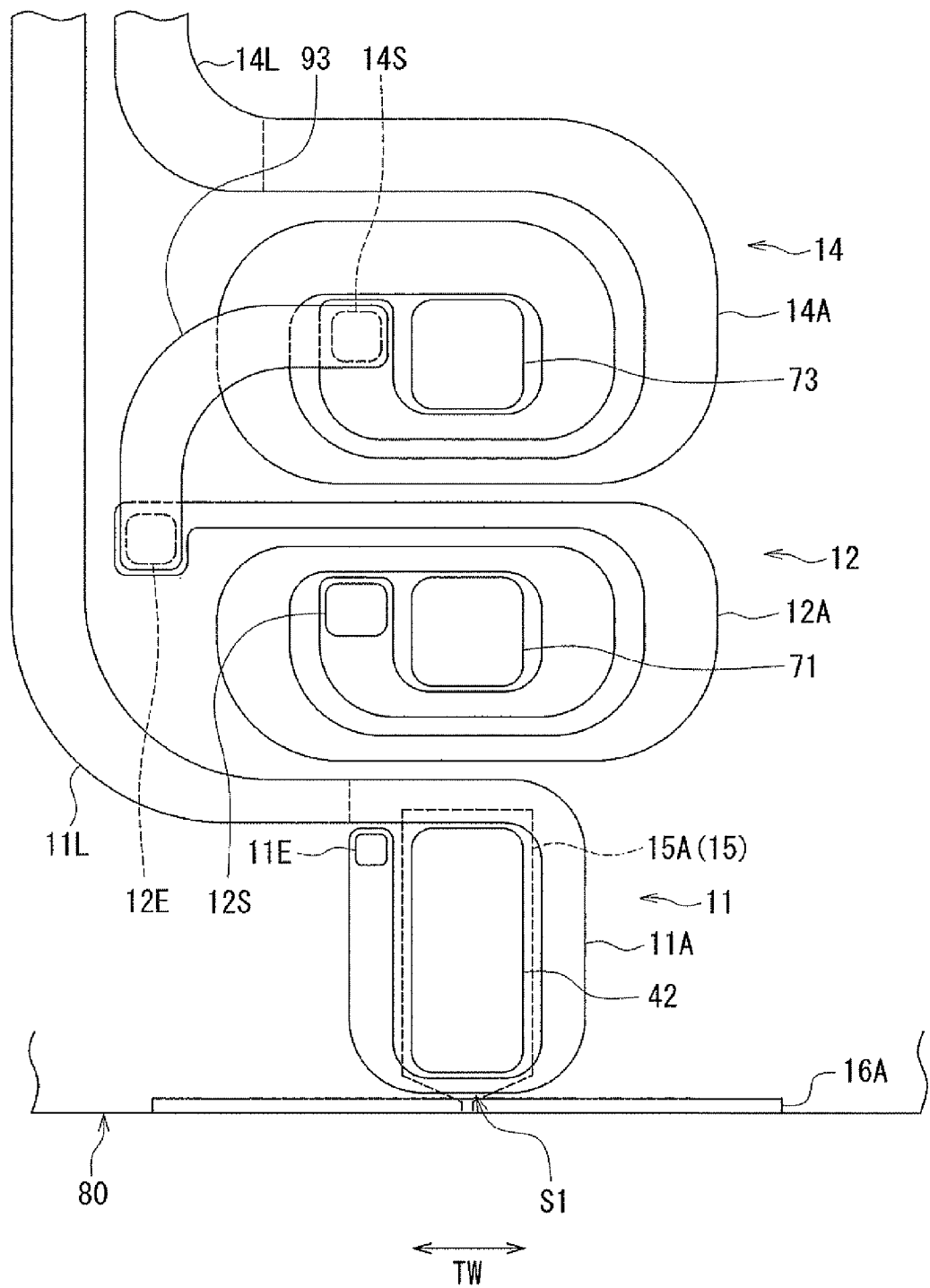
FIG. 13 is a plan view showing first, second, and fourth coils of the magnetic head according to the fourth embodiment of the invention.
Figure 14:
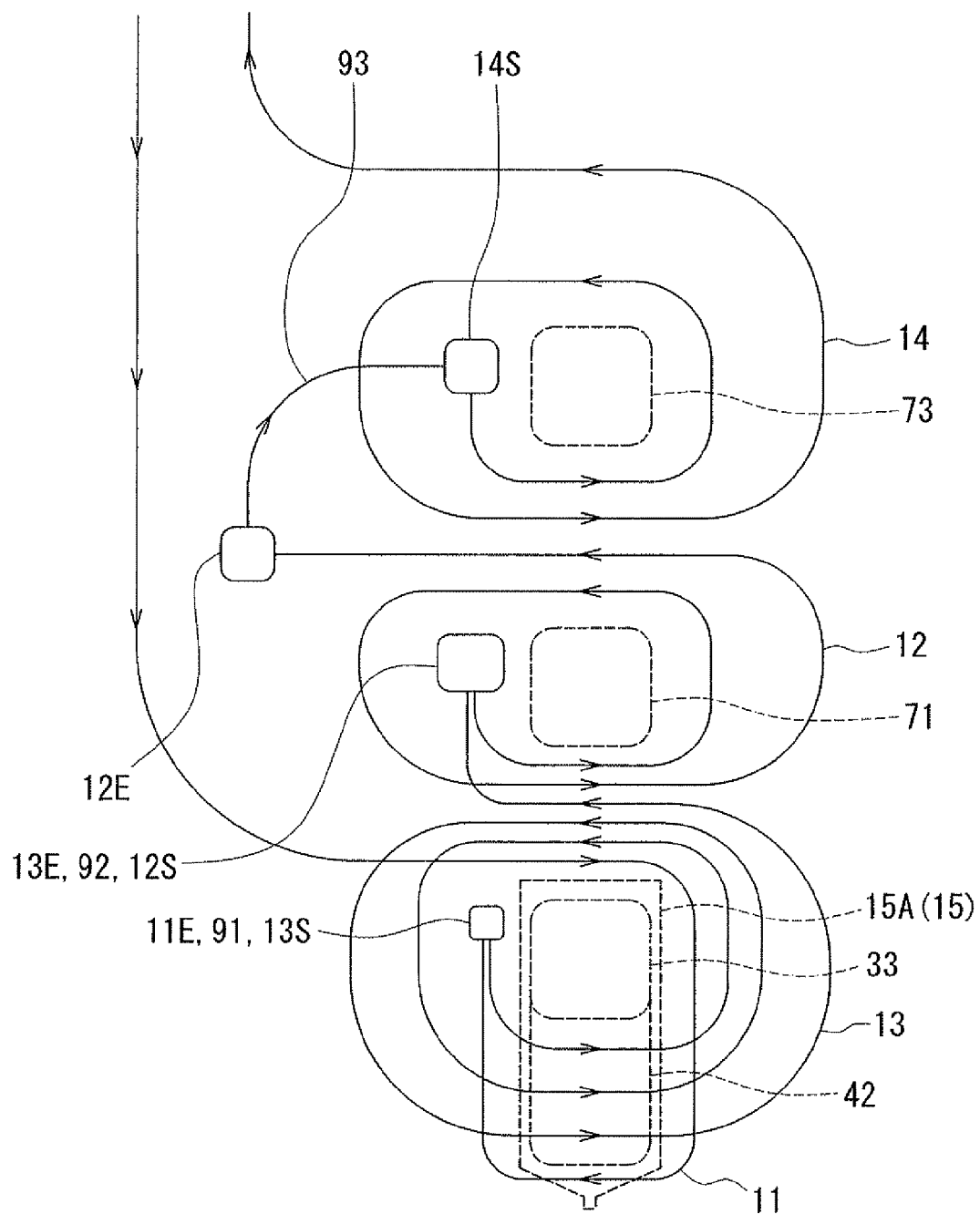
FIG. 14 is an explanatory diagram illustrating how the first to fourth coils are arranged and connected in the magnetic head according to the fourth embodiment of the invention.

A magnetic head according to a fourth embodiment of the invention will now be described with reference to FIG. 12 to FIG. 14. FIG. 12 is a cross-sectional view showing the write head section of the magnetic head according to the present embodiment. Note that FIG. 12 shows a cross section perpendicular to the medium facing surface and to the top surface of the substrate, or the main cross section, in particular. The arrows drawn within the magnetic head in FIG. 12 indicate the flows of magnetic fluxes. FIG. 13 is a plan view showing first, second and fourth coils of the magnetic head according to the present embodiment. FIG. 14 is an explanatory diagram illustrating how the first to fourth coils are arranged and connected in the magnetic head according to the present embodiment.

The configuration of the magnetic head according to the present embodiment is different from that of the magnetic head according to the third embodiment in the following respects. The magnetic head according to the present embodiment is without the magnetic layers 72 and 74. Furthermore, of the first to third portions 15A to 15C of the main pole 15, the second and third portions 15B and 15C are not provided.

In the present embodiment, the yoke part 41 includes not only the first and second portions 41A and 41B mentioned in the description of the second embodiment but also a third portion 41C. The third portion 41C is located farther from the medium facing surface 80 than is the second portion 41B and connected to the second portion 41B. In FIG. 12, the boundaries between the first to third portions 41A to 41C are shown by dotted lines. The coupling part 42 is directly connected to the first portion 41A of the yoke part 41. The core part 71 is directly connected to the second portion 41B of the yoke part 41 and magnetically connected to the main pole 15 via the yoke part 41 and the coupling part 42. The core part 73 is directly connected to the third portion 41C of the yoke part 41 and magnetically connected to the main pole 15 via the yoke part 41 and the coupling part 42. As viewed from above, the second winding portion 12A of the second coil 12 is wound in a counterclockwise direction from the coil connection part 12S to the coil connection part 12E. As viewed from above, the fourth winding portion 14A of the fourth coil 14 is wound in a counterclockwise direction from the coil connection part 14S to the boundary between the fourth winding portion 14A and the lead portion 14L.

As shown in FIG. 12, a magnetic flux corresponding to the magnetic field produced by the second coil 12 passes through the core part 71, the yoke part 41, the coupling part 42, and the main pole 15 in this order. A magnetic flux corresponding to the magnetic field produced by the fourth coil 14 passes through the core part 73, the yoke part 41, the coupling part 42, and the main pole 15 in this order. The remainder of configuration, function and effects of the present embodiment are similar to those of the second or third embodiment.

Fifth Embodiment

Figure 15:
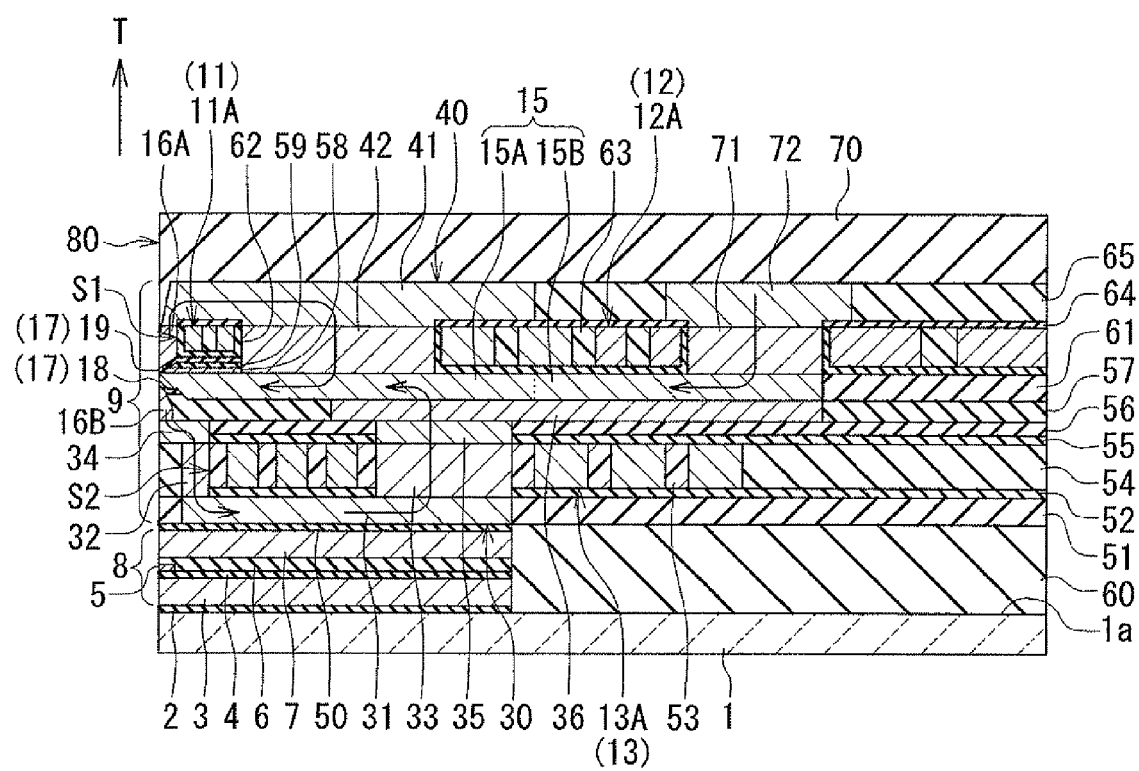
FIG. 15 is a cross-sectional view of a magnetic head according to a fifth embodiment of the invention.
Figure 16:
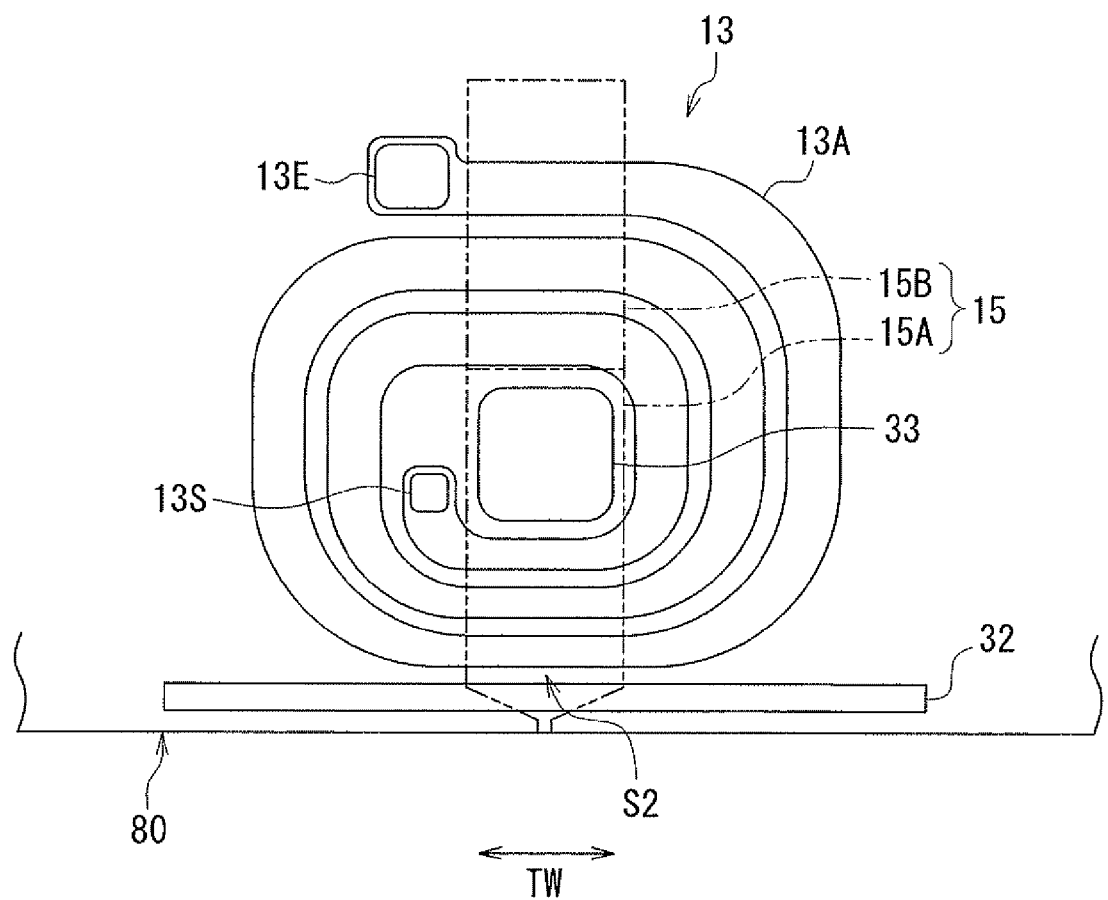
FIG. 16 is a plan view showing a third coil of the magnetic head according to the fifth embodiment of the invention.
Figure 17:
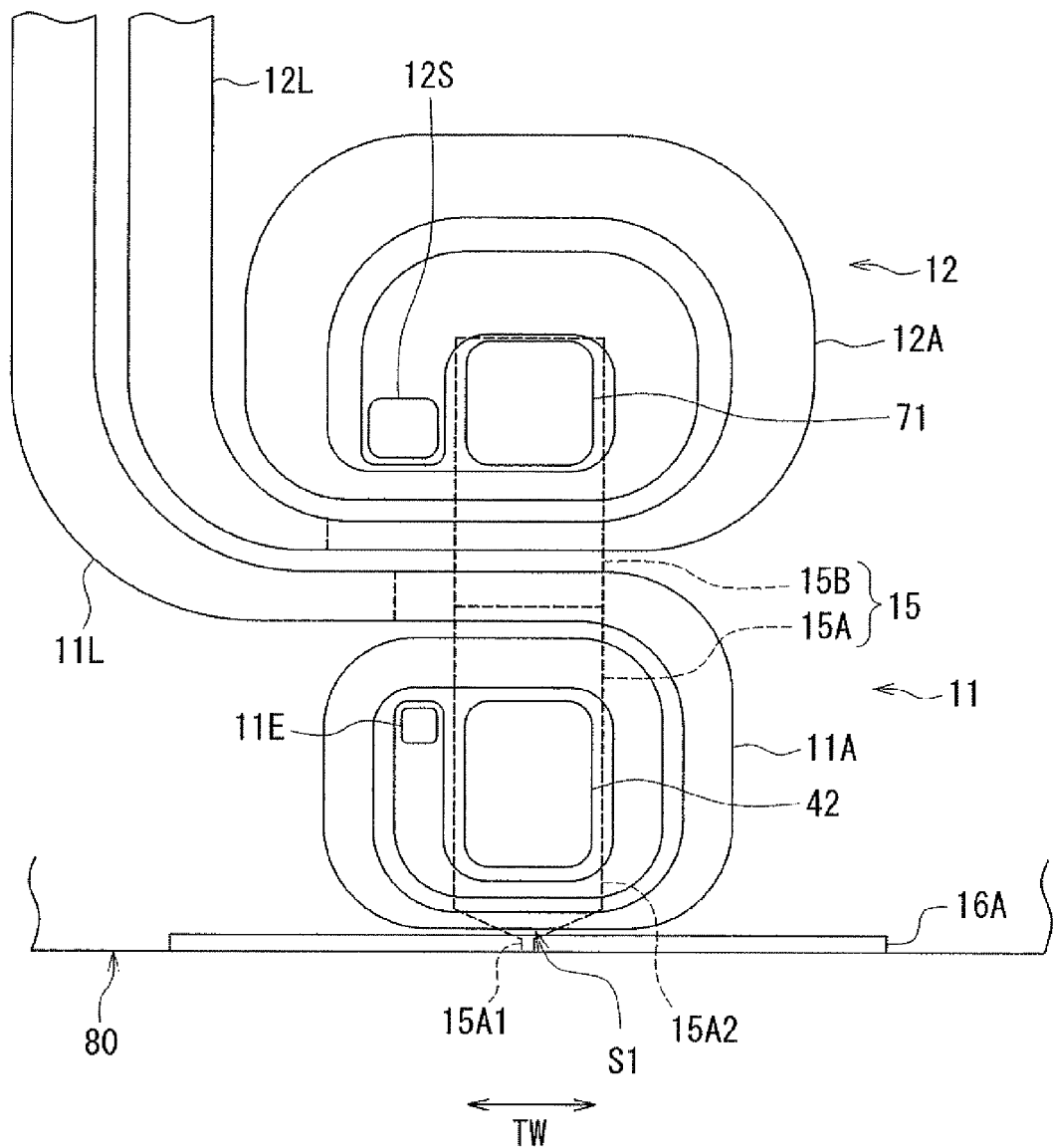
FIG. 17 is a plan view showing first and second coils of the magnetic head according to the fifth embodiment of the invention.
Figure 18:
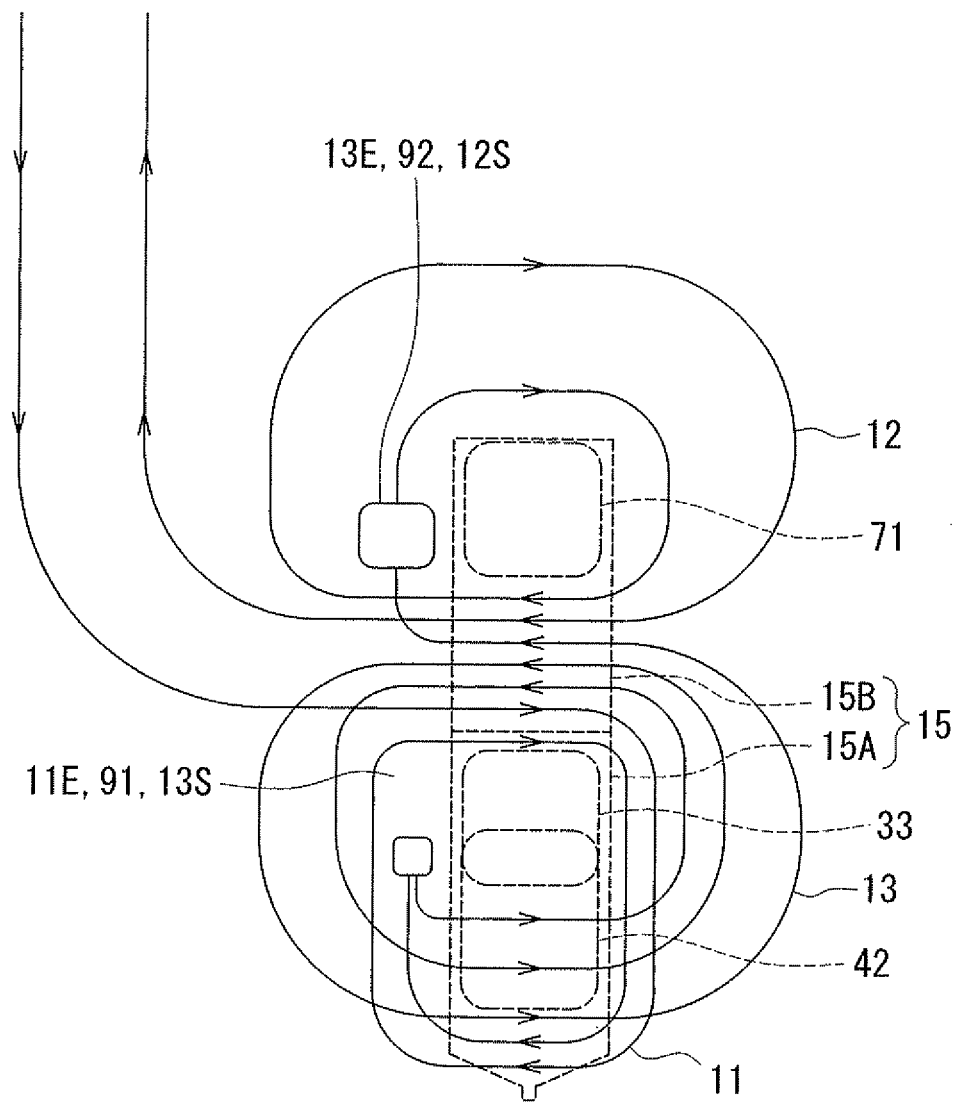
FIG. 18 is an explanatory diagram illustrating how the first to third coils are arranged and connected in the magnetic head according to the fifth embodiment of the invention.

A magnetic head according to a fifth embodiment of the invention will now be described with reference to FIG. 15 to FIG. 18. FIG. 15 is a cross-sectional view of the magnetic head according to the present embodiment. Note that FIG. 15 shows a cross section perpendicular to the medium facing surface and to the top surface of the substrate, or the main cross section, in particular. The arrows drawn within the magnetic head in FIG. 15 indicate the flows of magnetic fluxes. FIG. 16 is a plan view showing a third coil of the magnetic head according to the present embodiment. FIG. 17 is a plan view showing first and second coils of the magnetic head according to the present embodiment. FIG. 18 is an explanatory diagram illustrating how the first to third coils are arranged and connected in the magnetic head according to the present embodiment.

The configuration of the magnetic head according to the present embodiment is different from that of the magnetic head according to the first embodiment in the following respects. In the magnetic head according to the present embodiment, the first coil 11 is wound approximately two turns around the coupling part 42. Thus, in the present embodiment the number of turns of the second coil 12 is equal or almost equal to that of the first coil 11. As viewed from above, the first winding portion 11A of the first coil 11 is wound in a clockwise direction from the boundary between the first winding portion 11A and the lead portion 11L to the coil connection part 11E. The insulating layer 63 is disposed between the first coil 11 and the second coil 12 and in the space between adjacent turns of each of the first and second coils 11 and 12.

The remainder of configuration, function and effects of the present embodiment are similar to those of the first embodiment. In the second to fourth embodiments also, the number of turns of the first coil 11 may be approximately two, as in the present embodiment.

The present invention is not limited to the foregoing embodiments, and various modifications may be made thereto. For example, the magnetic head may include the first return path section 40 only, not both of the first and second return path sections 40 and 30. Furthermore, as far as the requirements of the appended claims are met, the number of turns of each of the first to fourth coils 11 to 14 is not limited to the examples illustrated in the foregoing embodiments, and may be arbitrarily chosen.

It is apparent that the present invention can be carried out in various forms and modifications in the light of the foregoing descriptions. Accordingly, within the scope of the following claims and equivalents thereof, the present invention can be carried out in forms other than the foregoing most preferred embodiments.

What is claimed is:

1. A magnetic head for perpendicular magnetic recording, comprising:
   a medium facing surface that faces a recording medium;
   first and second coils that produce magnetic fields corresponding to data to be written on the recording medium;
   a main pole having an end face located in the medium facing surface, the main pole allowing magnetic fluxes that correspond to the magnetic fields produced by the first and second coils to pass, and producing a write magnetic field for writing the data on the recording medium by means of a perpendicular magnetic recording system;
   a write shield made of a magnetic material and having an end face located in the medium facing surface;
   a gap part made of a nonmagnetic material and interposed between the main pole and the write shield;
   a first return path section made of a magnetic material and located on a front side in a direction of travel of the recording medium relative to the main pole; and
   a core part made of a magnetic material and located on the front side in the direction of travel of the recording medium relative to the main pole, wherein:
   the end face of the write shield includes a first end face portion located on the front side in the direction of travel of the recording medium relative to the end face of the main pole;
   the first return path section includes: a yoke part that is magnetically connected to the write shield; and a coupling part that is located away from the medium facing surface and magnetically couples the yoke part and the main pole to each other;
   the main pole, the gap part, the write shield, the yoke part, and the coupling part form a first space enclosed by these components;
   the first coil is located on the front side in the direction of travel of the recording medium relative to the main pole and wound around the coupling part, part of the first coil passing through the first space;
   the core part is located farther from the medium facing surface than is the coupling part, and is magnetically connected to the main pole;
   the entire core part is spaced apart from the entire coupling part in a direction extending perpendicular to the medium facing surface; and
   the second coil is located on the front side in the direction of travel of the recording medium relative to the main pole and wound around the core part.

2. The magnetic head for perpendicular magnetic recording according to claim 1, wherein:
   the first coil includes a first winding portion having a planar spiral shape;
   the second coil includes a second winding portion having a planar spiral shape; and
   the first winding portion and the second winding portion are located in one plane.

3. The magnetic head for perpendicular magnetic recording according to claim 1, wherein the second coil has a number of turns no smaller than that of the first coil.

4. The magnetic head for perpendicular magnetic recording according to claim 1, wherein the second coil has a number of turns greater than that of the first coil.

5. The magnetic head for perpendicular magnetic recording according to claim 1, wherein:
   the main pole includes a first portion, and a second portion that is located farther from the medium facing surface than is the first portion and connected to the first portion;
   the coupling part is directly connected to the first portion of the main pole; and
   the core part is directly connected to the second portion of the main pole.

6. The magnetic head for perpendicular magnetic recording according to claim 1, wherein:
   yoke part includes a first portion, and a second portion that is located farther from the medium facing surface than is the first portion and connected to the first portion;
   the coupling part is directly connected to the first portion of the yoke part; and
   the core part is directly connected to the second portion of the yoke part and magnetically connected to the main pole via the yoke part and the coupling part.

7. The magnetic head for perpendicular magnetic recording according to claim 1, further comprising:
   a second return path section made of a magnetic material and located on a rear side in the direction of travel of the recording medium relative to the main pole; and
   a third coil located on the rear side in the direction of travel of the recording medium relative to the main pole, wherein:
   the second return path section connects the write shield and part of the main pole away from the medium facing surface to each other so as to form a second space enclosed by the main pole, the gap part, the write shield, and the second return path section; and
   the third coil is wound around part of the second return path section, and part of the third coil passes through the second space.

8. The magnetic head for perpendicular magnetic recording according to claim 7, wherein the second coil has a number of turns no smaller than that of the first coil, and the third coil has a number of turns no smaller than that of the second coil.

9. The magnetic head for perpendicular magnetic recording according to claim 7, wherein the second coil has a number of turns greater than that of the first coil, and the third coil has a number of turns greater than that of the second coil.

10. The magnetic head for perpendicular magnetic recording according to claim 1, wherein the end face of the write shield further includes a second, a third, and a fourth end face portion, the second end face portion being located on a rear side in the direction of travel of the recording medium relative to the end face of the main pole, the third and fourth end face portions being located on opposite sides of the end face of the main pole in a track width direction.

* * * * *